US011541372B2

(12) United States Patent
Paranthaman et al.

(10) Patent No.: US 11,541,372 B2
(45) Date of Patent: Jan. 3, 2023

(54) ADSORBENTS, SYSTEMS AND METHODS FOR THE REMOVAL OF HEAVY METALS FROM CONTAMINATED WATER

(71) Applicants: UT-BATTELLE, LLC, Oak Ridge, TN (US); UNIVERSITY OF TENNESSEE RESEARCH FOUNDATION, Knoxville, TN (US)

(72) Inventors: Mariappan Parans Paranthaman, Knoxville, TN (US); Constantinos Tsouris, Oak Ridge, TN (US); Samuel F. Evans, Knoxville, TN (US); Marko R. Ivancevic, Lombard, IL (US)

(73) Assignees: UNIVERSITY OF TENNESSEE RESEARCH FOUNDATION, Knoxville, TN (US); UT-BATTELLE, LLC, Oakridge, TN (US)

( * ) Notice: Subject to any disclaimer, the term of this patent is extended or adjusted under 35 U.S.C. 154(b) by 215 days.

(21) Appl. No.: 16/867,022

(22) Filed: May 5, 2020

(65) Prior Publication Data

US 2021/0346863 A1 Nov. 11, 2021

(51) Int. Cl.
| | |
|---|---|
| *B01J 20/20* | (2006.01) |
| *B01J 20/28* | (2006.01) |
| *B01J 20/34* | (2006.01) |
| *C02F 1/28* | (2006.01) |
| *B01D 15/10* | (2006.01) |
| *C02F 1/66* | (2006.01) |
| *B01J 20/32* | (2006.01) |
| *B03C 1/01* | (2006.01) |
| *C02F 101/10* | (2006.01) |
| *C02F 101/22* | (2006.01) |

(52) U.S. Cl.
CPC ............ *B01J 20/20* (2013.01); *B01D 15/10* (2013.01); *B01J 20/28004* (2013.01); *B01J 20/2805* (2013.01); *B01J 20/2808* (2013.01); *B01J 20/28009* (2013.01); *B01J 20/28016* (2013.01); *B01J 20/28059* (2013.01); *B01J 20/28061* (2013.01); *B01J 20/28064* (2013.01); *B01J 20/28066* (2013.01); *B01J 20/28083* (2013.01); *B01J 20/28085* (2013.01); *B01J 20/3231* (2013.01); *B01J 20/3416* (2013.01); *B01J 20/3475* (2013.01); *B03C 1/01* (2013.01); *C02F 1/283* (2013.01); *C02F 1/66* (2013.01); *B03C 2201/18* (2013.01); *C02F 2101/103* (2013.01); *C02F 2101/106* (2013.01); *C02F 2101/22* (2013.01)

(58) Field of Classification Search
CPC .............. B01J 20/20; B01J 20/28004; B01J 20/28009; B01J 20/28016; B01J 20/2805; B01J 20/28059; B01J 20/28061; B01J 20/28064; B01J 20/28066; B01J 20/2808; B01J 20/28083; B01J 20/28085; B01J 20/3231; B01J 20/3416; B01J 20/3475; B01D 15/10; B03C 1/01; B03C 2201/18; C02F 1/283; C02F 1/66; C02F 2101/103; C02F 2101/106; C02F 2101/22
USPC ........................................................ 502/417
See application file for complete search history.

(56) References Cited

U.S. PATENT DOCUMENTS

| | | |
|---|---|---|
| 9,884,804 B2 | 2/2018 | Hood et al. |
| 9,941,058 B2 | 4/2018 | Naskar et al. |
| 10,320,000 B2 | 6/2019 | Naskar et al. |
| 2018/0369791 A1 | 12/2018 | Paranthaman et al. |

OTHER PUBLICATIONS

Hong, Young-Seoub, et al. "Health Effects of Chronic Arsenic Exposure." Journal of Preventive Medicine and Public Health= Yebang Uihakhoe Chi, Korean Society for Preventive Medicine, Sep. 2014.
Shankar, Shiv, et al. "Arsenic Contamination of Groundwater: a Review of Sources, Prevalence, Health Risks, and Strategies for Mitigation." TheScientificWorldJournal, Hindawi Publishing Corporation, 2014.
Evans et al.: "Magnetic Adsorbents for Selective Removal of Selenite form Contaminated Water," Separation Science and Technology 54 (13), 2138-2146 (2019).
Schwartz et al.: "Leaching Potential and Redox Transformations of Arsenic and Selenium in Sediment Microcosms with Fly Ash." Applied Geochemistry, Pergamon, Feb. 23, 2016.
Mishra et al.: "Functionalized Graphene Sheets for Arsenic Removal and Desalination of Sea Water." Desalination, Elsevier, Feb. 11, 2011.
Santos et al.: "Selenium contaminated waters: An overview of analytical methods, treatment options and recent advances in sorption methods", Sci Total Environ, 521-522: 246-260. (2015).
Edition, F. (2011) Guidelines for drinking-water quality. WHO chronicle, 38(4): 104-108.
Frankenberger et al.: "Bioremediation of selenium-contaminated sediments and water. BioFactors", 14(1?4): 241-254. (2001).
Fu, F.; Cheng, Z.; Lu, J. (2015) Synthesis and use of bimetals and bimetal oxides in contaminants removal from water: a review. RSC Advances, 5(104): 85395-85409.
Sun, W.; Pan, W.; Wang, F.; Xu, N. (2015) Removal of Se(IV) and Se(VI) by MFe2O4 nanoparticles from aqueous solution. Chemical Engineering Journal, 273: 353-362.

(Continued)

*Primary Examiner* — Edward M Johnson
(74) *Attorney, Agent, or Firm* — Fox Rothschild LLP

(57) ABSTRACT

An adsorbent for a target compound can include porous carbon particles having pores with a predominant pore size less than 10 nm, and magnetic nanoparticles (MNP) nucleated on the carbon surface and within the pores of carbon particles to provide a carbon magnetic nanoparticle adsorbent (C-MNA). A method for removing target compounds with an adsorbent, a system for removing contaminants from a liquid, and a method for adsorbing target compounds from a fluid are also disclosed.

43 Claims, 20 Drawing Sheets

(56) References Cited

OTHER PUBLICATIONS

Asiabi, H.; Yamini, Y.; Shamsayei, M. (2017) Highly selective and efficient removal of arsenic(V), chromium(VI) and selenium(VI) oxyanions by layered double hydroxide intercalated with zwitterionic glycine. J Hazard Mater, 339: 239-247.

Jegadeesan, G.; Mondal, K.; Lalvani, S.B. (2003) Comparative study of selenite adsorption on carbon based adsorbents and activated alumina. Environ Technol, 24(8): 1049-1059.

Rabiul Awual, M.; Munjur Hasan, M.; Ihara, T.; Yaita, T. (2014) Mesoporous silica based novel conjugate adsorbent for efficient selenium(IV) detection and removal from water. Microporous and Mesoporous Materials, 197: 331-338.

Cui, W.; Li, P.; Wang, Z.; Zheng, S.; Zhang, Y. (2018) Adsorption study of selenium ions from aqueous solutions using MgO nanosheets synthesized by ultrasonic method. J Hazard Mater, 341: 268-276.

Vilardi, G.; Mpouras, T.; Dermatas, D.; Verdone, N.; Polydera, A.; Di Palma, L. (2018) Nanomaterials application for heavy metals recovery from polluted water: The combination of nano zero-valent iron and carbon nanotubes. Competitive adsorption non-linear modeling. Chemosphere, 201: 716-729.

Li, Y.; Cheng, Y.; Daemen, L.L.; Veith, G.M.; Levine, A.M.; Lee, R.J.; Mahurin, S.M.; Dai, S.; Naskar, A.K.; Paranthaman, M.P. (2017) Neutron vibrational spectroscopic studies of novel tire-derived carbon materials. Phys Chem Chem Phys, 19(33): 22256-22262.

Adhikari, B. (2000) Reclamation and recycling of waste rubber. Progress in Polymer Science, 25(7): 909-948.

Naskar, A.K.; Bi, Z.; Li, Y.; Akato, S.K.; Saha, D.; Chi, M.; Bridges, C.A.; Paranthaman, M.P. (2014) Tailored recovery of carbons from waste tires for enhanced performance as anodes in lithium-ion batteries. RSC Advances, 4(72).

Li, Y.; Paranthaman, M.P.; Akato, K.; Naskar, A.K.; Levine, A.M.; Lee, R.J.; Kim, S.-O.; Zhang, J.; Dai, S.; Manthiram, A. (2016) Tire-derived carbon composite anodes for sodium-ion batteries. Journal of Power Sources, 316: 232-238.

Li, Y.; Adams, R.A.; Arora, A.; Pol, V.G.; Levine, A.M.; Lee, R.J.; Akato, K.; Naskar, A.K.; Paranthaman, M.P. (2017) Sustainable Potassium-Ion Battery Anodes Derived from Waste-Tire Rubber. Journal of the Electrochemical Society, 164(6): A1234-A1238.

Gnanaraj, J.; Lee, R.; Levine, A.; Wistrom, J.; Wistrom, S.; Li, Y.; Li, J.; Akato, K.; Naskar, A.; Paranthaman, M. (2018) Sustainable Waste Tire Derived Carbon Material as a Potential Anode for Lithium-Ion Batteries. Sustainability, 10(8).

Li, Y.; Levine, A.M.; Zhang, J.; Lee, R.J.; Naskar, A.K.; Dai, S.; Paranthaman, M.P. (2018) Carbon/tin oxide composite alectrodes for improved lithium-ion batteries. Journal of Applied Electrochemistry, 48(7): 811-817.

Boota, M.; Paranthaman, M.P.; Naskar, A.K.; Li, Y.; Akato, K.; Gogotsi, Y. (2015) Waste Tire Derived Carbon-Polymer Composite Paper as Pseudocapacitive Electrode with Long Cycle Life. ChemSusChem, 8(21): 3576-3581.

Hood, Z.D.; Adhikari, S.P.; Li, Y.; Naskar, A.K.; Figueroa-Cosme, L.; Xia, Y.; Chi, M.; Wright, M.W.; Lachgar, A.; Paranthaman, M.P. (2017) Novel Acid Catalysts from Waste-Tire-Derived Carbon: Application in Waste-to-Biofuel Conversion. ChemistrySelect, 2(18): 4975-4982.

Hood, Z.D.; Adhikari, S.P.; Evans, S.F.; Wang, H.; Li, Y.; Naskar, A.K.; Chi, M.; Lachgar, A.; Paranthaman, M.P. (2018) Tire-derived carbon for catalytic preparation of biofuels from feedstocks containing free fatty acids. Carbon Resources Conversion, 1(2): 165-173.

Hood, Z.D.; Yang, X.; Li, Y.; Naskar, A.K.; Chi, M.; Paranthaman, M.P. (2018) Conversion of Waste Tire Rubber into High-Value-Added Carbon Supports for Electrocatalysis. Journal of the Electrochemical Society, 165(14): H881-H888.

Yang, X.Y.; Chen, L.H.; Li, Y.; Rooke, J.C.; Sanchez, C.; Su, B.L. (2017) Hierarchically porous materials: synthesis strategies and structure design Chem Soc Rev, 46(2): 481-558.

Yang, Y.; Chiang, K.; Burke, N. (2011) Porous carbon-supported catalysts for energy and environmental applications: A short review. Catalysis Today, 178(1): 197-205.

Stein, A.; Wang, Z.; Fierke, M.A. (2009) Functionalization of Porous Carbon Materials with Designed Pore Architecture. Advanced Materials, 21(3): 265-293.

Oschatz, M.; Walczak, R. (2018) Crucial Factors for the Application of Functional Nanoporous Carbon-Based Materials in Energy and Environmental Applications. C, 4(4).

Kici?ski, W.; Szala, M.; Bystrzejewski, M. (2014) Sulfur-doped porous carbons: Synthesis and applications. Carbon, 68: 1-32.

Islam, M.T.; Saenz-Arana, R.; Hernandez, C.; Guinto, T.; Ahsan, M.A.; Bragg, D.T.; Wang, H.; Alvarado-Tenorio, B.; Noveron, J.C. (2018) Conversion of waste tire rubber into a high-capacity adsorbent for the removal of methylene blue, methyl orange, and tetracycline from water. Journal of Environmental Chemical Engineering, 6(2): 3070-3082.

Islam, M.T.; Hernandez, C.; Ahsan, M.A.; Pardo, A.; Wang, H.; Noveron, J.C. (2017) Sulfonated resorcinol-formaldehyde microspheres as high-capacity regenerable adsorbent for the removal of organic dyes from water. Journal of Environmental Chemical Engineering, 5(5): 5270-5279.

Kefeni, K.K.; Msagati, T.A.M.; Mamba, B.B. (2017) Ferrite nanoparticles: Synthesis, characterisation and applications in electronic device. Materials Science and Engineering: B, 215: 37-55.

Proposed Selenium Criterion Maximum Concentration for the Water Quality Guidance for the Great Lakes System. In Agency, E.P., Ed. Federal Register, 1996; vol. 61, pp. 58444-58449.

Martin-Hernandez, F.; Garcia-Hernandez, M.M. (2010) Magnetic properties and anisotropy constant of goethite single crystals at saturating high fields. Geophysical Journal International, 181(2): 756-761.

Martínez, M.; Giménez, J.; de Pablo, J.; Rovira, M.; Duro, L. (2006) Sorption of selenium(IV) and selenium(VI) onto magnetite. Applied Surface Science, 252(10): 3767-3773.

Tadic, M.; Panjan, M.; Damnjanovic, V.; Milosevic, I. (2014) Magnetic properties of hematite (?-Fe2O3) nanoparticles prepared by hydrothermal synthesis method. Applied Surface Science, 320: 183-187.

Lu, A.H.; Salabas, E.L.; Schuth, F. (2007) Magnetic nanoparticles: synthesis, protection, functionalization, and application. Angew Chem Int Ed Engl, 46(8): 1222-1244.

Song, X.; Boily, J.F. (2013) Carbon dioxide binding at dry FeOOH mineral surfaces: evidence for structure-controlled speciation. Environ Sci Technol, 47(16): 9241-9248.

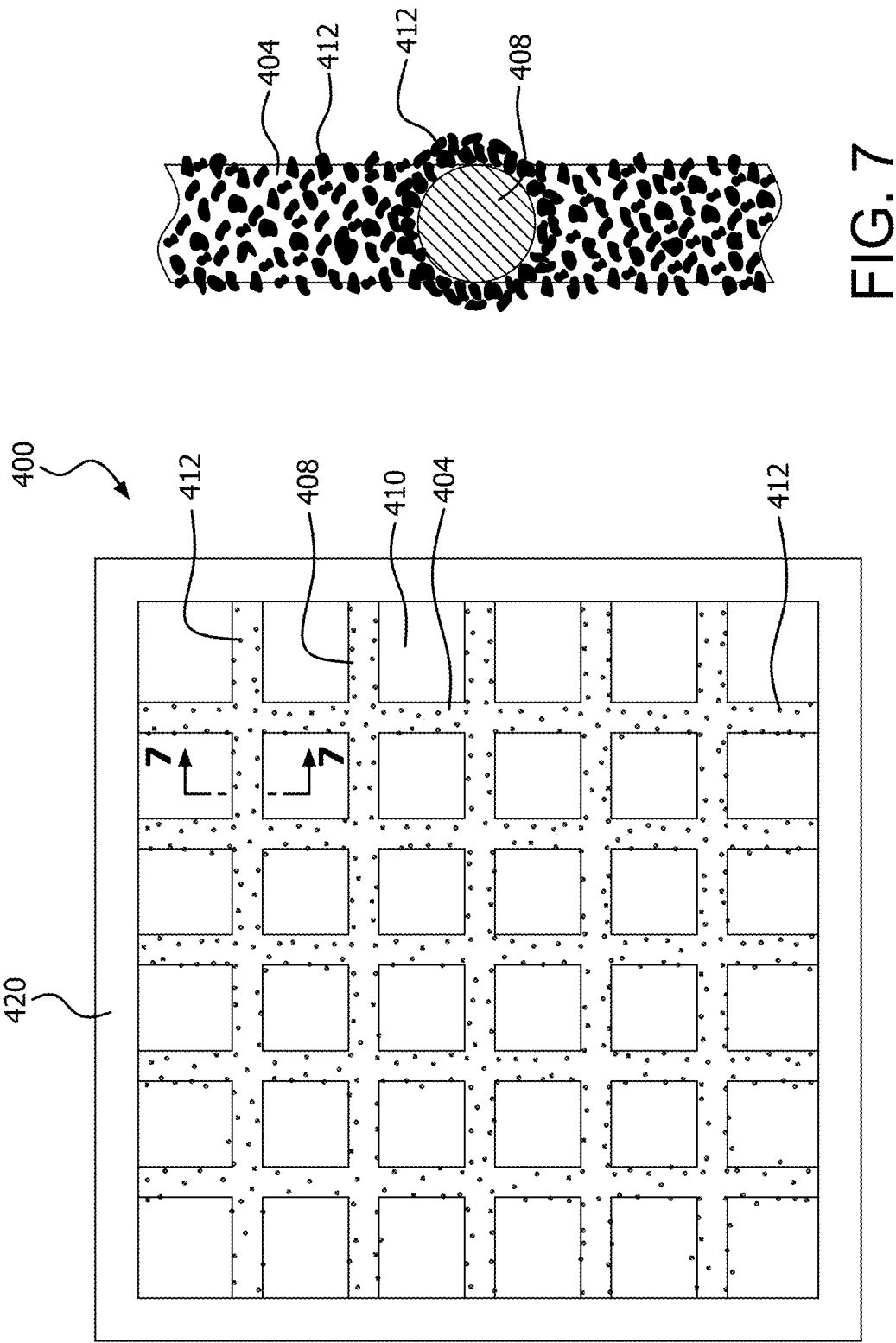

ADSORBENTS, SYSTEMS AND METHODS FOR THE REMOVAL OF HEAVY METALS FROM CONTAMINATED WATER

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

This invention relates generally to the removal of target compounds from liquids, and more particularly to adsorbents, systems and methods for the removal of heavy metals from water.

BACKGROUND OF THE INVENTION

Water availability and sourcing are becoming ever more important for society as growing populations increase demand for potable and irrigation water. Pollution of water sources has and continues to be a threat to human health and the environment. This problem is expected to worsen as clean water demand increases with population. Before use, water must meet guidelines set by the US Environmental Protection Agency, European Union, World Health Organization or other regulatory agencies depending on the location. This is due to the multitude of inorganic, organic, biological, and particulate contaminants that can be present in water that poses serious health and environmental hazards. Mining and petrochemical operations often produce significant quantities of wastewater with high concentrations of toxic metals such as selenium, arsenic, and lead. The millions of gallons of wastewater produced from industrial activities present an economic, legal, and technological challenge as the water must be treated before being stored or reintroduced back into the environment.

Selenium is a naturally occurring contaminant that is commonly present in water as selenite ($SeO_3^{2-}$), and selenate ($SeO_4^{2-}$) salt ions. While selenium is a necessary supplement, overexposure is dangerous and potentially fatal to humans and animals. Selenite and selenate have been found to be quite toxic, with doses of 1.5-6 mg/kg of body weight leading to death. In solution these ions will exist as cationic species or protonated species depending on the pH of the contaminated water stream. The danger is exacerbated when the heavy metal is leached into a water supply, which commonly occurs in various regions of the USA such as South Dakota, in addition to areas of China. With such a high toxicity at such low concentrations, investigations into efficient removal of selenium has been explored extensively.

Methods developed to remove selenium include treatments with various adsorbents including magnetic nanoparticles, layered double hydroxides, mesoporous materials, MgO nanosheets, and carbon-nanotubes. Ion exchange resins have also been explored as low-cost adsorbents and they have been used in conjunction with reverse osmosis, which adds additional energy requirements to the process. Adsorption is the primary mechanism utilized for selenium removal.

Arsenic is widely distributed over the earth. Arsenic can leach into groundwater through rocks and soil, and is used in pesticides, wood preservatives, and tobacco as well. Arsenic in groundwater is a widespread problem. Arsenic levels tend to be higher in drinking water that comes from ground sources, such as wells, than from water from surface sources, such as lakes or reservoirs. Inorganic arsenic is a carcinogen which is any substance that promotes carcinogenesis, the formation of cancer. Long-term exposure to arsenic in drinking water can cause cancer in the skin, lungs, bladder and kidney. Inorganic arsenic compounds are more toxic than organoarsenicals, and trivalent arsenite is more toxic than pentavalent arsenate. Arsenic is tasteless, colorless, and odorless; therefore testing is needed for it to be detected. Methods developed to remove arsenic include treatments with various adsorbents including metal oxides, zirconium oxide, and graphene nanosheets. The most effective adsorbents in recent literature has been Uio-66, a water stable zirconium metal-organic framework with arsenic uptake values being around 303 mg/g.

Researchers at Oak Ridge National Laboratory have developed a method for converting waste car tires into a uniquely microporous and mesoporous carbon black material. Recycling of tire-waste is of great importance due to the health hazards and environmental cost from improper disposal. When tire waste is placed in landfills, chemical additives from their production can leach into the environment, causing damage. Other reprocessing methods, such as burning for energy, creates further problems with air pollution. Tire-derived carbon has displayed promise for Li, Na, and K-ion battery materials, pseudo-capacitors, biofuel conversion, and electrocatalysis. Use of porous carbon as a support and functionalized material for catalysis, energy, and environmental applications has been well studied. Bio-derived and waste material carbon precursors are widely explored for their sustainability, cost-savings and comparable performance to engineered carbon alternatives. Examples of tire-derived carbon and uses for the product can be found in U.S. Pat. No. 9,941,058 ("Flexible and Conductive Waste Tire-Derived Carbon/Polymer Composite Paper as Pseudocapacitive Electrode"), U.S. Pat. No. 9,441,113 ("Pyrolytic Carbon Black Composite and Method of Making the Same"), and U.S. Pat. No. 10,320,000 ("Pyrolytic Carbon Black Composite and Method of Making the Same"), and US 2018/0369791 "Production of Biofuels with Novel Salts Impregnated Tire-Derived Carbon Catalysts"), the disclosures of which are hereby incorporated fully by reference. Previous studies have also shown sulfonated carbon and tire-derived carbon's ability to remove organic dye pollutants effectively.

SUMMARY OF THE INVENTION

An adsorbent for a target compound includes porous carbon particles having pores with a predominant pore size less than 10 nm, and magnetic nanoparticles (MNP) nucleated on the carbon surface and within the pores of carbon particles to provide a carbon magnetic nanoparticle adsorbent (C-MNA). The pores of the porous carbon can include a mixture of micropores having a pore size less than 2 nm, mesopores having a pore size of from 2-50 nm, and macropores having pore size greater than 50 nm.

The carbon can be tire derived carbon (TDC). The carbon can be activated carbon. The carbon particle size can be 10-2000 microns. The MNP particle size can be 2-100 nm with predominant size by the number of pores of less than 10 nm.

The surface area of the carbon can be from 200-1200 $m^2/g$. The surface area of the carbon in the C-MNA after impregnation with the MNP can be 10-100 $m^2/g$. The surface area of the carbon in the C-MNA after impregnation with the MNP can be 25-50 m²/g. The proportion of MNP to carbon can be from 1-30%, by weight based on the total weight of the carbon and MNP.

The MNP can include at least one selected from the group consisting of $Fe_3O_4$, $Fe_2O_3$, FeO, CoO, $Co_2O_3$, $Co_3O_4$, CrO, $Gd_2O_3$, $Dy_2O_3$, MnBi, $BaFe_{12}O_{19}$, $SrFe_{12}O_{19}$, $M_2Fe_2O_4$ (M=Co; Zn; Mn,Zn; Co,Zn; Fe,Zn; Ni,Zn), FeNi, FeCo, FeSi, $Nd_2Fe_{14}B$, $Sm_2Co_5$, $Sm_2Co_{17}$, $SmFe_{16}N_2$, and $Fe_{16}N_2$.

The target compounds can include compounds that will chemically coordinate with the MNP. The target compound can be at least one selected from the group consisting of selenium, tellurium, chromium, copper, cadmium, barium, mercury, arsenic and lead. The target compound can be a cation. The cation can be at least one selected from the group consisting of the 4+ oxidation state of selenium ($Se^{4+}$) and the 5+ oxidation state of arsenic ($As^{5+}$). The adsorption capacity of the adsorbent can be from 7 mg/g to 100 mg/g of target compound to C-MNA.

A method for removing target compounds with an adsorbent can include the step of providing a magnetically activated adsorbent for the target compounds, comprising porous carbon particles having pores with a pore size less than 10 nm, and magnetic nanoparticles (MNP) nucleated on the carbon surface and within the pores of carbon particles to provide a carbon magnetic nanoparticle adsorbent (C-MNA). The target compounds are contacted with the C-MNA.

The method can further include the step of regenerating the adsorbent to remove contaminant from the adsorbent. The regeneration step can include treating the adsorbent with a basic solution. The basic solution can include 0.1-1 molar NaOH. The target compounds can be contained within a liquid, and the regenerating step can include the step of separating the used adsorbent particles from the liquid. After contacting the C-MNA particles with the target compound, a magnetic field can be applied to attract the C-MNA particles with the target compound, for separating and regenerating the C-MNA particles.

The target compounds can be contained in a liquid, and the method can further include the step of adjusting the pH before the contacting step. The adjusting step can include adjusting to a pH of from 3-10. The target compounds can be contaminants and can be provided in a liquid waste stream, and the method can further comprising the step of treating the waste stream to raise the pH.

The contacting step can include positioning the adsorbent in a column, and flowing the target compounds through the column to contact the adsorbent. The method can further include the step of adding silica to the column to increase the macroporosity of the column and prevent clogging. The amount of silica that is added is from 5-50 weight percent based on the combined weight percentage of the adsorbent and the silica. The method can also include the step of adding a filler, the filler comprising 10-40 weight percentage of cotton, based on the total weight of the C-MNA, silica, and cotton.

A system for removing contaminants from liquids can include a container and an adsorbent in the container. The adsorbent includes porous carbon particles having pores with a pore size less than 10 nm, and magnetic nanoparticles (MNP) nucleated on the carbon surface and within the pores of carbon particles to provide a carbon magnetic nanoparticle adsorbent (C-MNA).

The container can include a fluid inlet and a fluid outlet, such that fluid flows in through the inlet, through the adsorbent, and out through the outlet. The container can be a column. The column can contain silica. The liquid can be a slurry. The C-MNA can be provided on a support. The support can include a filter. The system can further include a magnetic field source for attracting C-MNA particles with adsorbed target compound for regeneration of the C-MNA particles.

A method of adsorbing target compounds from a fluid can include the steps of providing a container and providing an adsorbent in the container. The adsorbent can include porous carbon particles having pores with a pore size less than 10 nm, and magnetic nanoparticles (MNP) nucleated on the carbon surface and within the pores of carbon particles to provide a carbon magnetic nanoparticle adsorbent (C-MNA). The target compounds are contacted with the adsorbent in the container. The target compound can include at least one selected from the group consisting of selenium, tellurium, chromium, copper, cadmium, barium, mercury, arsenic and lead. The C-MNA particles can be adhered to a filter, and the liquid can be caused to flow through the filter.

BRIEF DESCRIPTION OF THE DRAWINGS

There are shown in the drawings embodiments that are presently preferred it being understood that the invention is not limited to the arrangements and instrumentalities shown, wherein:

FIG. 6 is a plan view of a filtration membrane with incorporated C-MNA particles.

FIG. 7 is a cross section taken along line 7-7 in FIG. 6.

FIG. 13B) MNA particles; FIG. 13C) elemental mapping of C and Fe with C-MNA particles; and FIG. 13D) elemental mapping of C and Fe with MNA particles.

FIG. 17B) C-MNA; and FIG. 17C sand and C-MNA.

FIG. 18B) C-MNA; and FIG. 18C) mixture of sand and C-MNA.

DETAILED DESCRIPTION OF THE INVENTION

Figure 1:
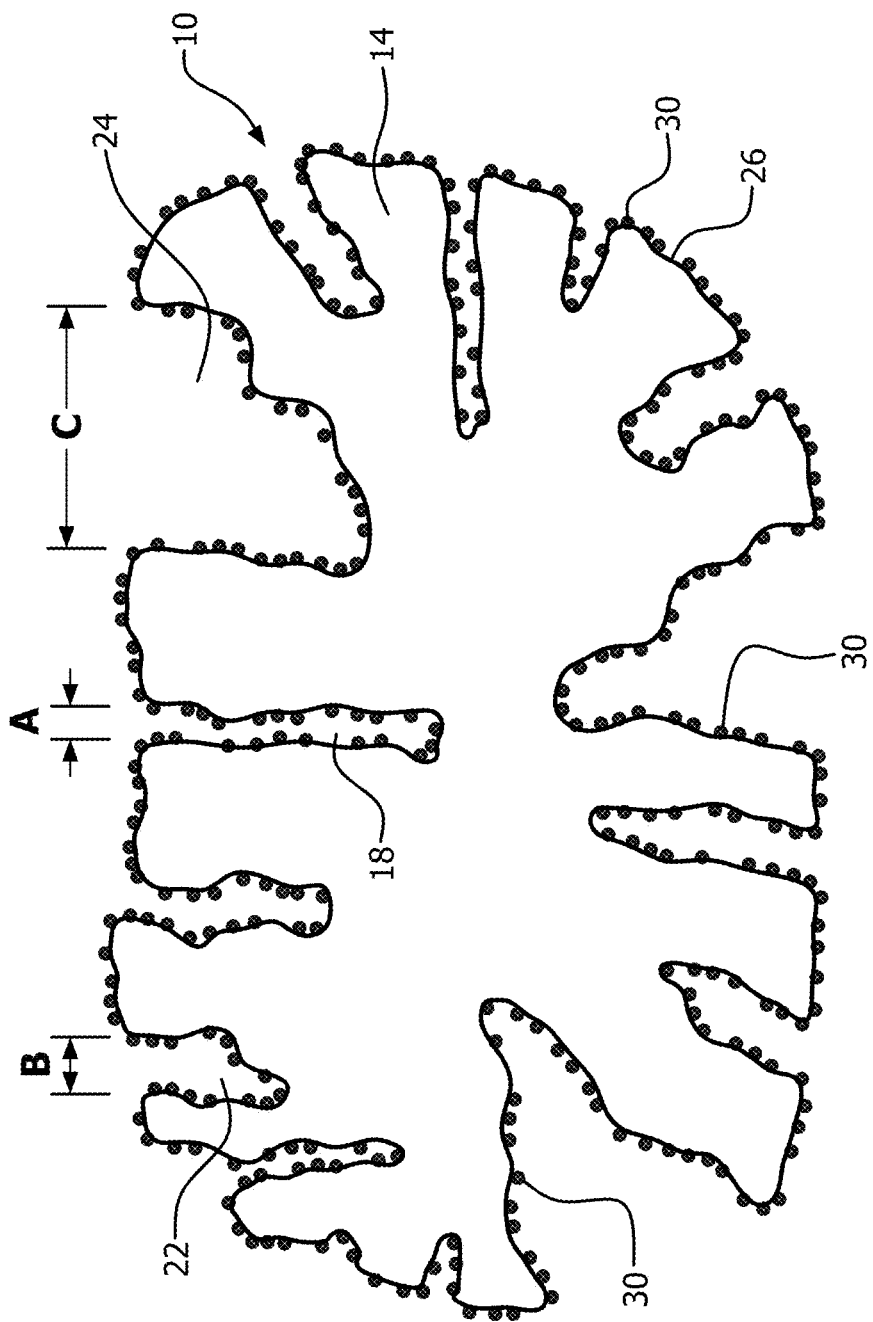
FIG. 1 is a schematic diagram of a Carbon Magnetic Nanoparticle adsorbent (C-MNA).

An adsorbent for a target compound includes porous carbon particles that can have pores with a predominant pore size less than 10 nm. Magnetic nanoparticles (MNP) are nucleated on the carbon surface and within the pores of carbon particles to provide a carbon magnetic nanoparticle adsorbent (C-MNA). The term "predominant" as used herein means greater than the number of pores that are over 10 nm in pore size. The carbon-supported magnetic nanoparticle adsorbents (C-MNA) have a porosity and pore distribution that promotes infiltration of the MNA into the pores of the porous carbon support particle.

The pores of the porous carbon comprise a mixture of micropores having a pore size less than 2 nm, mesopores having a pore size of from 2-50 nm, and macropores having pore size greater than 50 nm. The macropores must have a pore size less that the size of the porous carbon particle. The mesopores can have a pore size of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 nm. The mesopores can have a pore size that is within a range of any high value and low value selected from these values.

The carbon particles can be formed from any suitable porous carbon. The carbon particles comprises tire-derived carbon (TDC) that is formed by pyrolyzing pieces of tires. The tire-derived carbon can be produced with and without pre-sulfonation before the pyrolysis step. The adsorbent can be formed from other porous carbon materials. One such porous carbon comprises activated carbon.

The carbon particle can have any suitable size. The carbon particle size can be from 10-2000 microns. The carbon particle size can be 10, 20, 30, 40, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, and 2000 microns. The carbon particle size can be in a range of any high value and low value selected from these values.

The MNP can have any suitable size. The MNP particle size can be 2-100 nm with predominant size of less than 10 nm. The term predominantly as used herein means more than 50% of the MNP particles. The MNP particle size can be 2, 3, 5, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 and 100 nm. The MNP particle size can be within a range of any high value and low value selected from these values.

The proportion of MNP to carbon can be from 1-30%, by weight based on the total weight of the carbon and MNP. The proportion of MNP to carbon, by weight based on the total weight of the carbon and MNP, can be 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30%. The proportion of MNP to carbon can be in a range of any high value and low value selected from these values.

The surface area of the carbon particle can be from 200-1200 m²/g. The surface area of the carbon can be 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, and 1200 m²/g. The surface area of the carbon particle can be in a range of any high value and low value selected from these values.

The surface area of the carbon particle in the C-MNA after impregnation with the MNP can be from 10-100 m²/g The surface area of the carbon in the C-MNA after impregnation with the MNP can be 10, 15, 20, 25, 30, 35, 40, 45, 50, 55, 60, 65, 70, 75, 80, 85, 90, 95 and 100 m²/g. The surface area of the carbon after impregnation with the MNP can be in a range of any high value and low value selected from these values. The surface area of the carbon in the C-MNA after impregnation with the MNP can be from 25-50 m²/g.

The MNP can be selected from a number of possible compounds. The MNP can be at least one selected from the group consisting of $Fe_3O_4$, $Fe_2O_3$, FeO, CoO, $Co_2O_3$, $Co_3O_4$, CrO, $Gd_2O_3$, $Dy_2O_3$, MnBi, $BaFe_{12}O_{19}$, $SrFe_{12}O_{19}$, $M_2Fe_2O_4$ (M=Co; Zn; Mn,Zn; Co,Zn; Fe,Zn; Ni,Zn), FeNi, FeCo, FeSi, $Nd_2Fe_{14}B$, $Sm_2Co_5$, $Sm_2Co_{17}$, $SmFe_{16}N_2$, and $Fe_{16}N_2$.

The target compounds can include any compounds that will chemically coordinate with the MNP. The target compound can include at least one selected from the group consisting of selenium, tellurium, chromium, copper, cadmium, barium, mercury, arsenic and lead. The target compound can be contained in a liquid. The liquid can be part of a slurry. The target compound can be a cation. The cation can include at least one selected from the group consisting of the 4+ oxidation state of selenium ($Se^{4+}$) and the 5+ oxidation state of arsenic ($As^{5+}$).

The adsorption capacity of the C-MNA adsorbent can be from 7 mg/g to 100 mg/g of target compound to C-MNA. The adsorption capacity of the C-MNA adsorbent can be 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 and 100 mg/g of target compound to C-MNA. The adsorption capacity of the C-MNA adsorbent can be in a range of any high value and low value selected from these values.

A method for removing target compounds with an adsorbent can include the step of providing a magnetically activated C-MNA adsorbent for the target compounds. The C-MNA particles comprise porous carbon particles having pores with a pore size less than 10 nm, and magnetic nanoparticles (MNP) nucleated on the carbon surface and within the pores of carbon particles to provide the carbon magnetic nanoparticle adsorbent (C-MNA). The C-MNA particles are contacted with a liquid or slurry containing the target compounds, whereupon the target compounds are adsorbed by the C-MNA.

The method can further include the step of regenerating the adsorbent to remove the target contaminant from the adsorbent. The regeneration step can include treating the adsorbent with a basic solution. The basic solution can be 0.1-1 molar NaOH. The target compounds adsorbed on the C-MNA particles can be contained within a liquid, and the regenerating step can include the step of separating the C-MNA particles with the adsorbed target compound from the liquid prior to regenerating the C-MNA particles by treating with the basic solution.

The separation step can include the step of applying a magnetic field to attract the C-MNA particles with the adsorbed target compound to remove these particles from the purified liquid. A magnetic field source can be provided for attracting C-MNA particles with adsorbed target compound for regeneration of the C-MNA particles. The magnetic field source can be a permanent magnet or an electromagnet, or another suitable source.

The target compounds can be contained in a liquid or slurry, and the method can further include the step of adjusting the pH before the contacting step. The adjusting step can include adjusting to a pH from 3-10. The target compounds can be contaminants and can be located in a liquid waste stream. The method can further comprise the step of treating the waste stream to raise the pH.

The contacting step can include positioning the C-MNA adsorbent particles in a column, and flowing the target compounds through the column to contact the adsorbent. Silica can be added to the column to increase the macroporosity of the column and prevent clogging. The small particle size of the C-MNA can cause packing issues. The amount of silica that can be added can be from 5-50 weight percent based on the combined weight percentage of the adsorbent and the silica. The weight percent amount of silica based on the combined weight percentage of the adsorbent and the silica can be 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50. The amount of silica based on the combined weight percentage of the adsorbent and the silica can be in a range of any high value and low value selected from these values.

The method can further include the step of adding a filler to the column. The filler can be cotton. Other fillers are possible. The cotton filler performs the function of stabilizing the distribution of the adsorbent in the adsorption column and allowing a constant flow of the solution through the column. The filler can include 10-40 weight percentage of cotton, based on the total weight of the C-MNA, silica, and cotton. The weight percentage of cotton based on the total weight of the C-MNA, silica and cotton can be in a range of any high value and low value selected from these values.

A system for removing contaminants from liquid streams can include a container, and C-MNA adsorbent particles in the container. The container can include a fluid inlet and a fluid outlet, fluid flowing from the inlet, through the adsorbent, and from the outlet. The container can be a column. Valves and pumps can be provided to control the flow of contaminated fluid with the C-MNA particles. A suitable processor can be provided to control the operation of the valves and pumps and other process equipment.

The C-MNA can be provided on a support. The support can include a filter. The C-MNA particles can be adhered to the membrane components of a filter that define filter membrane pores. The contaminated liquid is caused to flow through the filter membrane pores, where target compounds will be adsorbed by the MNP nucleated on the C-MNA particles that are attached to the filter membrane components. The filter membrane can also perform the function of filtering larger solids that may be present in the contaminated liquid, such as silt or debris, where the filter membrane pores are appropriately sized to retain such solids.

A method of adsorbing target compounds from a fluid can include the steps of providing a container and providing an adsorbent in the container. The adsorbent includes porous carbon particles having pores with a pore size less than 10 nm, and magnetic nanoparticles (MNP) nucleated on the carbon surface and within the pores of carbon particles to provide a carbon magnetic nanoparticle adsorbent (C-MNA). The target compounds are contacted with the adsorbent in the container.

By flowing wastewater through a bed of C-MNA adsorbents in a continuous system, the adsorbents can easily be integrated into an industrial process. Ion uptake rates of adsorbents vary when scaling from batch scale adsorption to continuous column tests due to transport effects. Fixed beds can experience uneven flow distribution, z-axis concentration gradients, mass transport limitations from inert media, and other mass transport limitations. Kinetics models, such as the Adams-Bohart model, have been developed to model the sorbent behavior in continuous settings. Employing these models facilitates the transition to full-scale industrial processes. By quantifying the maximum adsorption capacity, rate of adsorption, and breakthrough curve (a plot of concentration of the adsorbate in the effluent vs. time), the operation of adsorption columns can be optimized. Rate law and kinetic constants can also be used to normalize columns to account for varying volumes, masses, and flow rates.

FIG. 1 is a schematic diagram of a carbon magnetic nanoparticle adsorbent (C-MNA) 10. The C-MNA 10 is comprised by a porous carbon particle 14. The porous carbon particle 14 can have a variety of different poor sizes. For example, micropores 18 can have a pore size A less than 2 nm. Mesopores 22 can have a pore size B of from 2-50 nm. Macropores 24 can have a pore size C greater than 50 nm. Such delineations are variable, and other pore size ranges are possible. Magnetic nanoparticles adsorbent (MNA) particles 30 are adhered to surfaces 26 of the carbon particle 14 and to the walls of the micropores 18, mesopores 22 and macropores 24.

Figure 2:
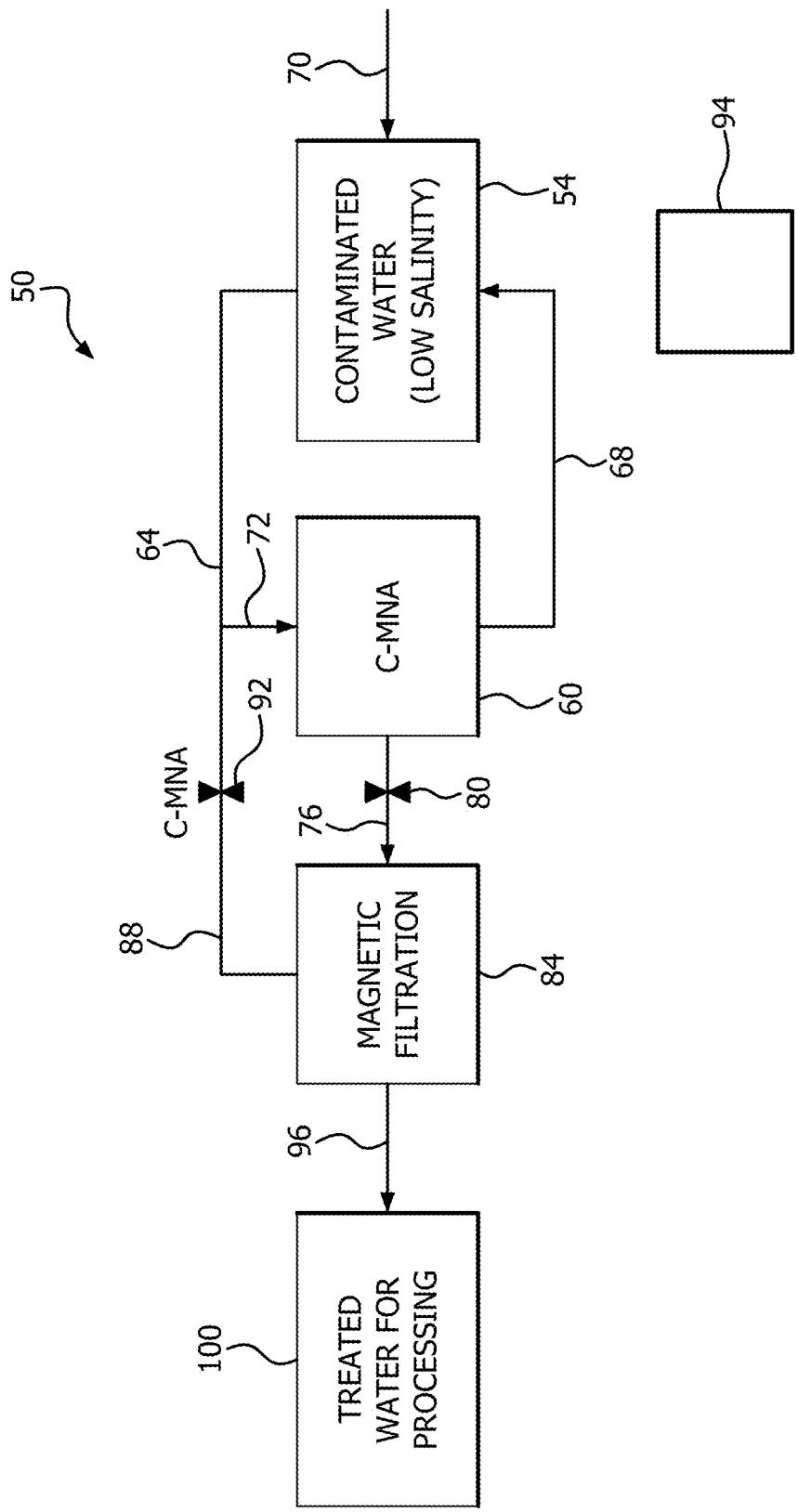
FIG. 2 is a flow diagram of a process for the removal of heavy metals from contaminated water with a carbon magnetic nanoparticle adsorbent.

FIG. 2 is a flow diagram of a system and process 50 for the removal of heavy metals from contaminated water with a carbon magnetic nanoparticle adsorbent. Water contaminated with heavy metal is introduced at water container/mixer 54. The water container/mixer 54 can have a water feed 70 to replenish the water container/mixer 54 on a continuous basis, however, the process can also be a batch process. C-MNA particles are held in C-MNA container 60. Contaminated water flows through line 64 and return line 72 to the C-MNA container 60 where heavy metals are adsorbed by the C-MNA particles. A recycle conduit 68 can be provided to route C-MNA particles and water back to the water container/mixer 54.

Treated water and C-MNA particles can exit the C-MNA container 60 through an exhaust line 76, which can be controlled by a suitable valve 80. The treated water with C-MNA particles having adsorbed heavy metals enters a magnetic filtration station 84 where a magnetic field is applied to separate the C-MNA particles and heavy metals from the water. The separated C-MNA particles can be returned to the C-MNA container 60 through a return line 88 and controlled by a valve 92. The C-MNA particles can be periodically replenished for replacement or regeneration, or regenerated in situ. A processor 94 can be used to control operation of pumps and valves and other process equipment, which can be through wireless or wired control.

Figure 3:
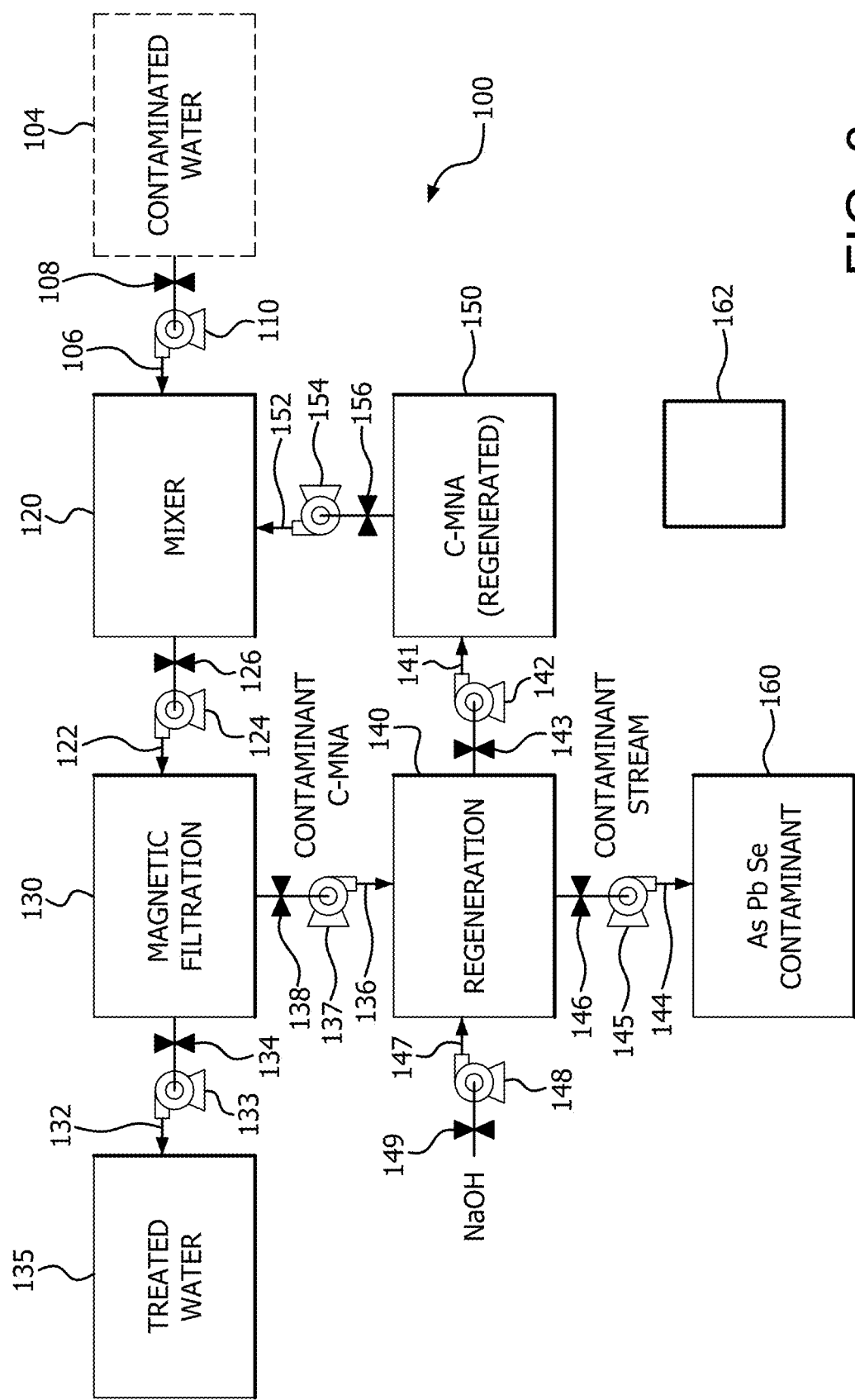
FIG. 3 is a flow diagram of a process for the removal of heavy metals from contaminated water with a carbon magnetic nanoparticle adsorbent and including regeneration of the C-MNA particles.

FIG. 3 is a flow diagram of a system and process 100 for the removal of metals from contaminated water with a C-MNA adsorbent, and including regeneration of the C-MNA particles. The system 100 can have a supply 104 of contaminated water, or an inlet. A conduit 106 supplies the contaminated water to a mixing station 120 and flow can be controlled by a control valve 108 and pump 110. The mixing station 120 contacts the contaminated water with C-MNA particles whereupon heavy metals are adsorbed by the C-MNA particles. The water and C-MNA particles are carried by conduit 122 to magnetic filtration/separation station 130. A pump 124 and valve 126 can be used to control flow through the conduit 122. Treated water leaves the magnetic filtration/separation station 130 through conduit 132 and can be collected for reuse at treated water collection station 135.

Regeneration of the C-MNA particles can take place at a regeneration station 140. C-MNA particles can be transported through a conduit 136 to the regeneration station 140. A pump 137 and valve 138 can be provided to control flow through the conduit 136. In the regeneration station 140 the C-MNA is contacted with a substance which will release the heavy-metal from the C-MNA particles. One such substance is NaOH, although others are possible. The NaOH is supplied through conduit 147 to the regeneration station 140. A pump 148 and valve 149 can be used to control the supply of NaOH to the regeneration station 140. The C-MNA particles that have adsorbed heavy metals are separated from the treated liquid, either at the regeneration station or in a separate separation station. The separation can be assisted by a magnetic field which will attract the C-MNA particles. Other separation processes are possible.

The liquid that is removed from the regeneration station 140 will contain the heavy metals and is removed through a conduit 144 to a contaminant collection station 160. A pump 145 and valve 146 can be provided to control flow through the conduit 144. The C-MNA particles are returned to a C-MNA particle holding station 150 through a conduit 141. A pump 142 and valve 143 can be provided to control flow through the conduit 141. The regenerated C-MNA particles are returned to the mixing station 120 through a conduit 152. A pump 154 and valve 156 can be provided to control flow through the conduit 152. A suitable processor 162 can be provided to control the valves, pumps and other process equipment and variables through appropriate connections, which can be wired or wireless.

Figure 4:
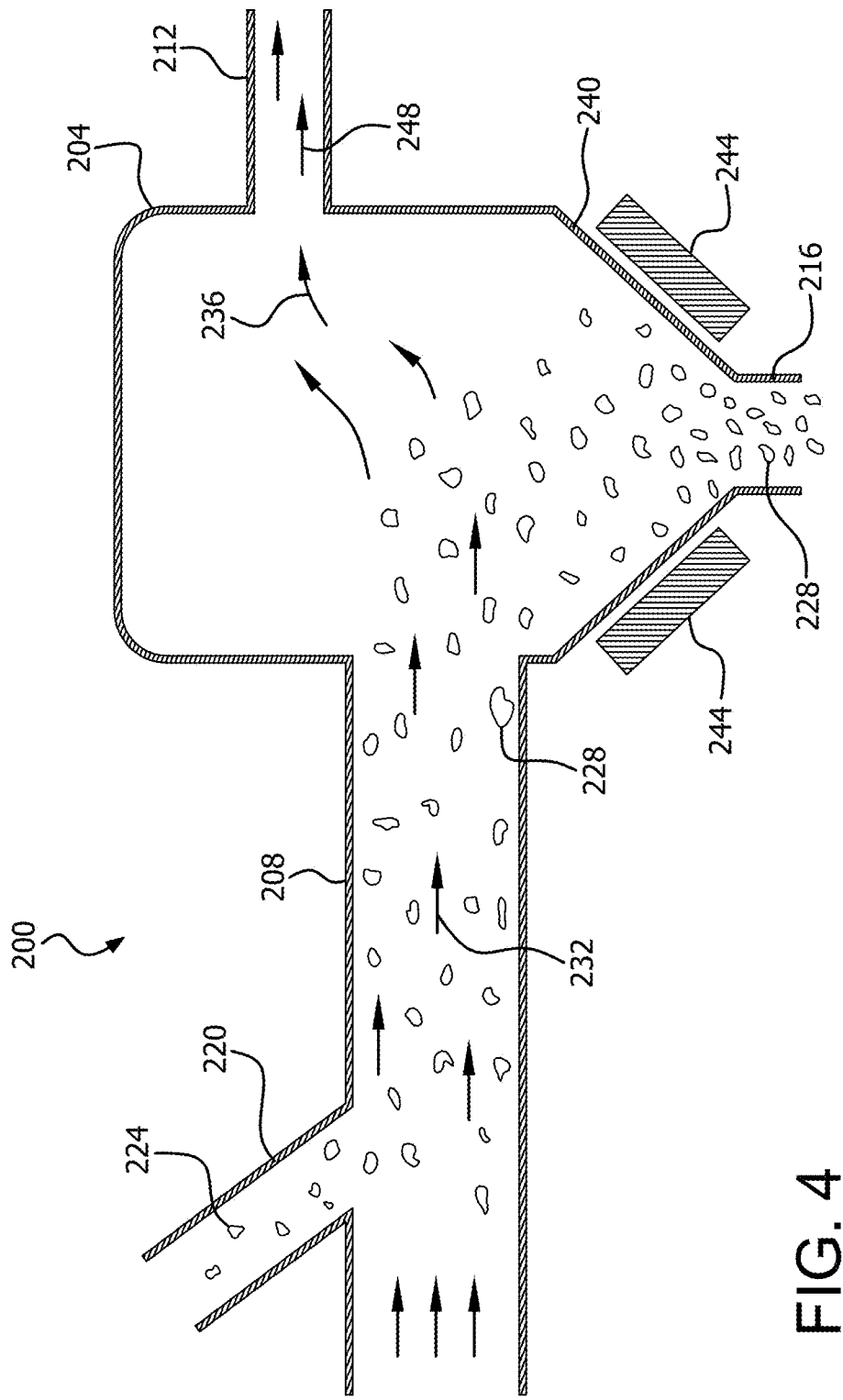
FIG. 4 is a schematic diagram of a separator for separating heavy metals and C-MNA particles from a purified water stream.

FIG. 4 is a schematic diagram of a separator 200 for separating contaminant and C-MNA particles from a contaminated water stream. The separator 200 includes a separation chamber 204 with a contaminated water inlet 208, a treated water outlet 212 and a C-MNA particle outlet 216. Contaminated water flows through the contaminated water inlet 208 as indicated by arrow 232. C-MNA particles 224 are introduced into the flowing contaminated water stream through a C-MNA inlet 220. The heavy metals in the contaminated water are adsorbed by the C-MNA particles to generate contaminant C-MNA particles 228 as the water travels into the separation chamber 204. In the separation chamber 204, the contaminant C-MNA particles 228 settle due in part to gravity and can be collected by a funnel-shaped bottom portion 240. Magnets 244 can also be supplied to generate an electromagnetic field in the separation chamber 204 that will actively attract the contaminant C-MNA particles 228 and separate them from the treated water stream 236. The contaminant C-MNA particles 228 exit through the C-MNA outlet 216. Treated water exits through the treated water outlet 212 as indicated by arrows 248.

Figure 5:
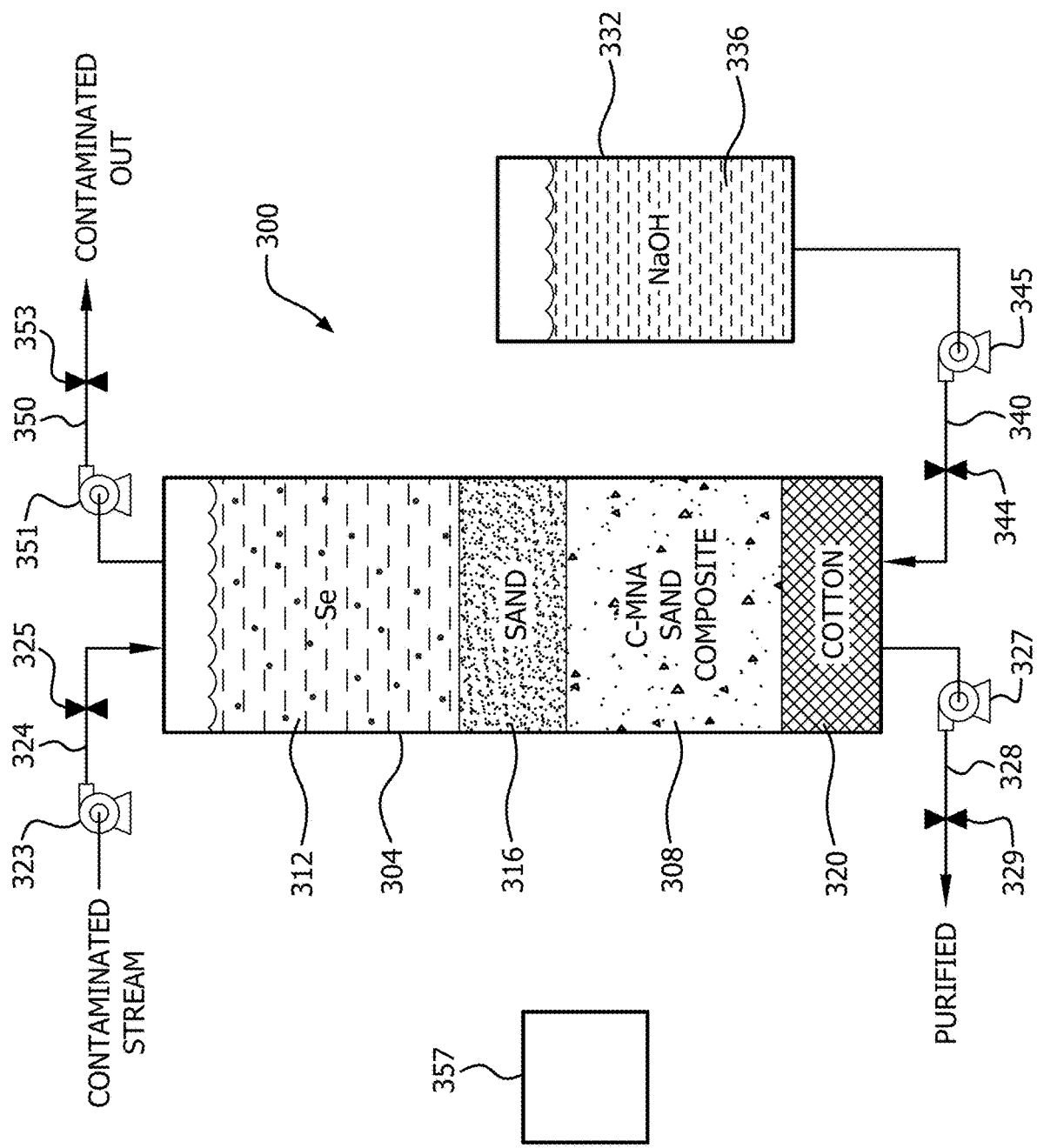
FIG. 5 is a schematic diagram of a column with C-MNA particles for the removal of heavy metals from a contaminated water stream.

FIG. 5 is a schematic diagram of a column system 300 with C-MNA particles for the removal of heavy metals such as Se from a contaminated water stream. The column 300 includes a column housing 304 and C-MNA particles 308. The C-MNA particles 308 can be combined with sand into a composite. The silica will increase the macroporosity of the column and prevent clogging. A layer of pure silica 316 can also be provided for this purpose. Contaminated water 312 enters the column 304 through a contaminated water inlet 324, and flow can be controlled by a pump 323 and a valve 325. A layer of cotton filler 320 can be provided. Treated water exits the column 300 through a purified water outlet 328. Flow through the outlet 328 can be controlled by a pump 327 and a valve 329.

The C-MNA particles 308 can be regenerated. A regeneration liquid supply container 332 can hold a suitable regenerating liquid 336 such as NaOH. A regenerating liquid conduit 340 into the column 304 can be controlled by a suitable valve 344 and pump 345 to supply regenerating fluid to the column 304 where the regenerating fluid will remove the heavy metals such as Se from the C-MNA particles 308. The regenerating fluid containing the desorbed heavy metals will exit the column through a contaminated liquid exhaust conduit 350. Flow through the contaminated liquid exhaust conduit 350 can be controlled by a pump 351 and a valve 353. A suitable processor 357 can be provided to control the operation of the pumps and the valves, as well as other process equipment and variable through wired or wireless connections.

FIGS. 6-7 illustrate a filter membrane 400 with incorporated C-MNA particles. The filter membrane 400 can have suitable membrane components such as membrane components 404 and cross components 408 to form membrane pores 410. The membrane components 404 and cross components 408 can be provided within a suitable outer framework 420. C-MNA particles 412 can be attached to the membrane components 404 and cross components 408. Contaminated water will flow through the pores 410 and will contact the C-MNA particles 412. Heavy metals will be adsorbed by the C-MNA particles and removed from the water stream. The filter membrane 400 can also be used for large solids filtration with appropriate sizing of the membrane pores 410.

Example 1—C-MNA Adsorbents for Selective Removal of Selenium from Contaminated Water Tire-derived carbon was synthesized. The surface area of the carbon was increased by chemical treatment with KOH (Sigma Aldrich, ≥85%) in a 4:1 ratio, followed by pyrolysis at 800° C. for 1 h in a flowing nitrogen atmosphere with a ramp rate of 10° C./min.

C-MNA synthesis was performed by dispersing carbon material in an aqueous solution containing $FeCl_3$ (Sigma-Aldrich, 97% purity) and $FeSO_4$ (Sigma-Aldrich, ≥99% purity) in a 6:5 mole ratio of Fe(III) and Fe(II). The solution was stirred for one hour, then heated to 70° C. 1 M NaOH (Alfa Aesar, pellets, 98% purity) was then added to the solution to initiate precipitation of MNA. The suspension of carbon in solution allowed for the infiltration of MNA into the mesopores and micropores of the carbon. After precipitation, the solution was filtered with micro filter paper, retaining the larger C-MNA particles and removing residual starting material and synthesized MNA.

MNA was synthesized for comparison to C-MNA. Iron precursor and precipitation solutions and procedure were the same as for C-MNA. Precipitated MNA particles were centrifuged for separation. Particles were held by a sintered magnet and rinsed with DI water to remove any residual starting materials and completely neutralize the pH of the samples, then oven dried in air.

X-ray diffraction (XRD) patterns were collected on a PANalytical Empyrean with a Cu Kα radiation. All data were processed with HighScore Plus. Inductively coupled plasma optical emission spectroscopy (ICP-OES) compositional analysis was performed to determine selenite removal from the solution with a Thermo Fischer iCAP Model 7400 ICP-OES Duo. Magnetic properties were measured with a Quantum Design (QD) Magnetic Property Measurement System at room temperature. A Zeiss Merlin VP scanning electron microscope (SEM) operated at 3 kV and a Hitachi HD-2300A scanning transmission electron microscope (STEM) with a field emission source operated at 200 kV in bright-field imaging mode at a 2.1 Å resolution, were used to characterize the surface morphologies of the samples.

Selenium adsorption tests were performed in a 5 mL of solution containing sodium selenite (Sigma, Bioreagent, ≥98% purity) or sodium selenate (Sigma, Bioxtra) and 20 mg of adsorbent. Trials were performed with a sample shaker to ensure uniform stirring for differing times. Removal of selenium was determined by the difference between the starting concentration of the solution and the final concentration with ICP-OES analysis. Percent removal and mass of selenium adsorbed per gram of sorbent were then calculated using equations a and b:

$$\text{Capacity} = \frac{(C_{Se,i} - C_{Se,f}) * V}{m_{Adsorbent}} \quad (a)$$

$$\text{Percent removal} = 100 * \left(\frac{C_{Se,i} - C_{Se,f}}{C_{Se,i}}\right) \quad (b)$$

where $C_{Se,i}$ is the initial concentration of selenium, $C_{Se,f}$ is the final concentration of selenium post testing, V is the volume of sample used, and $m_{Adsorbent}$ is the mass of the C-MNA or MNA used in the sample.

Determination of maximum adsorption by time, selenite concentration dependence, and pH dependence were all performed by the described procedure. Adsorption dependence with time was determined by mixing the adsorbents for 30 min, 1, 4, and 24 h. Selenite concentrations of 5, 10, 25, and 50 ppm were tested. The pH dependence of the adsorbents was tested for 3, 5, 7, 9, and 11 at a selenite concentration of 5 ppm. pH was adjusted using 1 M NaOH and HCl solutions.

C-MNA and MNA underwent a variety of selenium removal tests to determine adsorbent performance. Initial testing exhibited complete selectivity for selenite (Se(IV)) over selenate (Se(VI)). Selenite species have ten times the toxicity of selenates, so selective removal would be beneficial. Removal of selenite species stems from the interaction of the charged $SeO_3^{2-}$ with surface $FeOH^{2+}$ and $FeH^{2+}$ groups. Investigation was made into the effect of time on adsorption found maximum selenite uptake after 30 min of agitation. Longer agitation times are thought to be ineffective due to the repelling electrostatic interference of sulfonyl groups present on the tire derived carbon surface.

Figure 8:
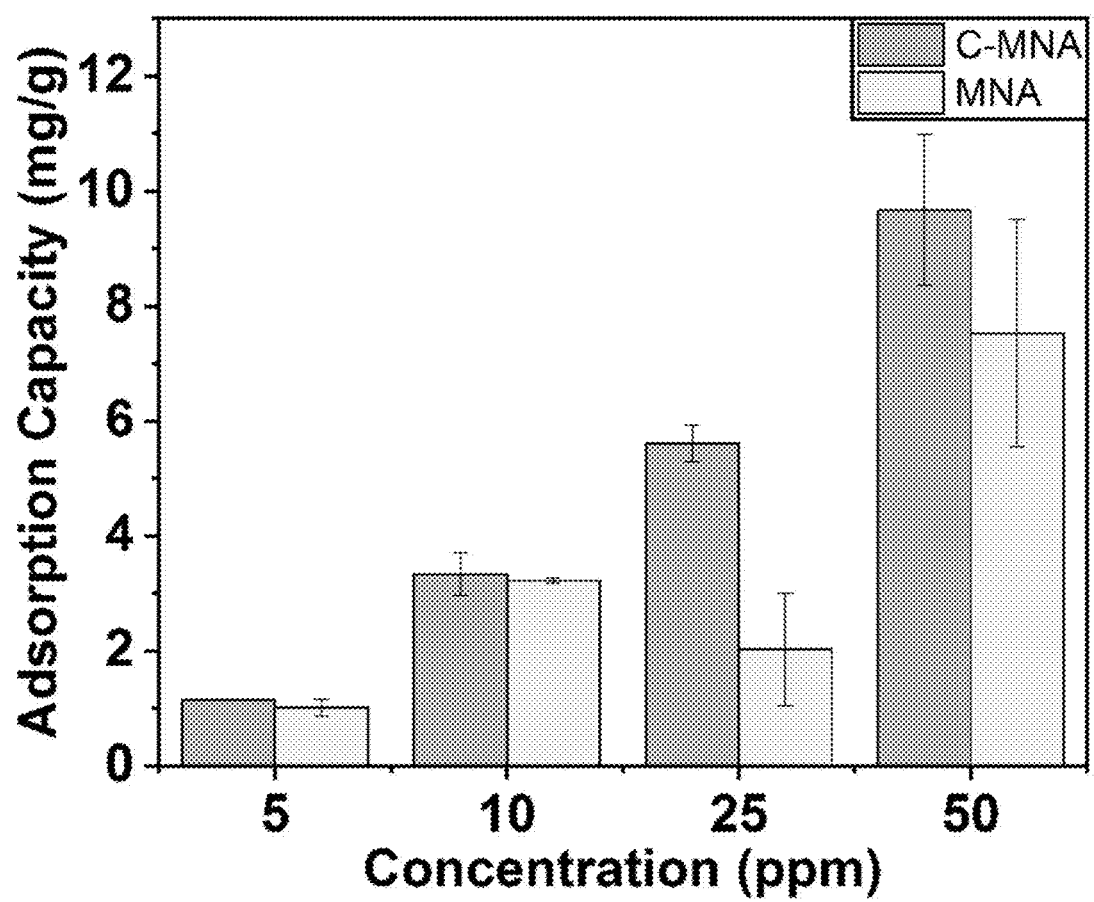
FIG. 8 is a plot of adsorption capacity (mg/g) versus concentration (ppm) for C-MNA particles and MNA particles for the selective removal of selenium as Se(IV) from contaminated water.

To determine the maximum selenite uptake of C-MNA, trials were performed with 5, 10, 25, 50 ppm selenite concentrations with a pH 5 to maximize adsorption. FIG. 8 is a plot of adsorption capacity (mg/g) versus concentration (ppm) for C-MNA particles and MNA particles for the selective removal of selenium from contaminated water. FIG. 8 displays the resulting adsorption capacity values, with a maximum of 9.67 mg/g for 50 ppm. Selenium concentration in contaminated sites is generally much lower from 10 ppm to less than 1 ppm. The adsorption capacity for 5 ppm Se(IV) concentration, 1.14 mg/g, is more pertinent to real-world conditions. Selenite removal tests were performed over a range of pH to determine if the porous carbon support provided any benefits to the MNAs in terms of adsorption or protection from degradation.

Figure 9:
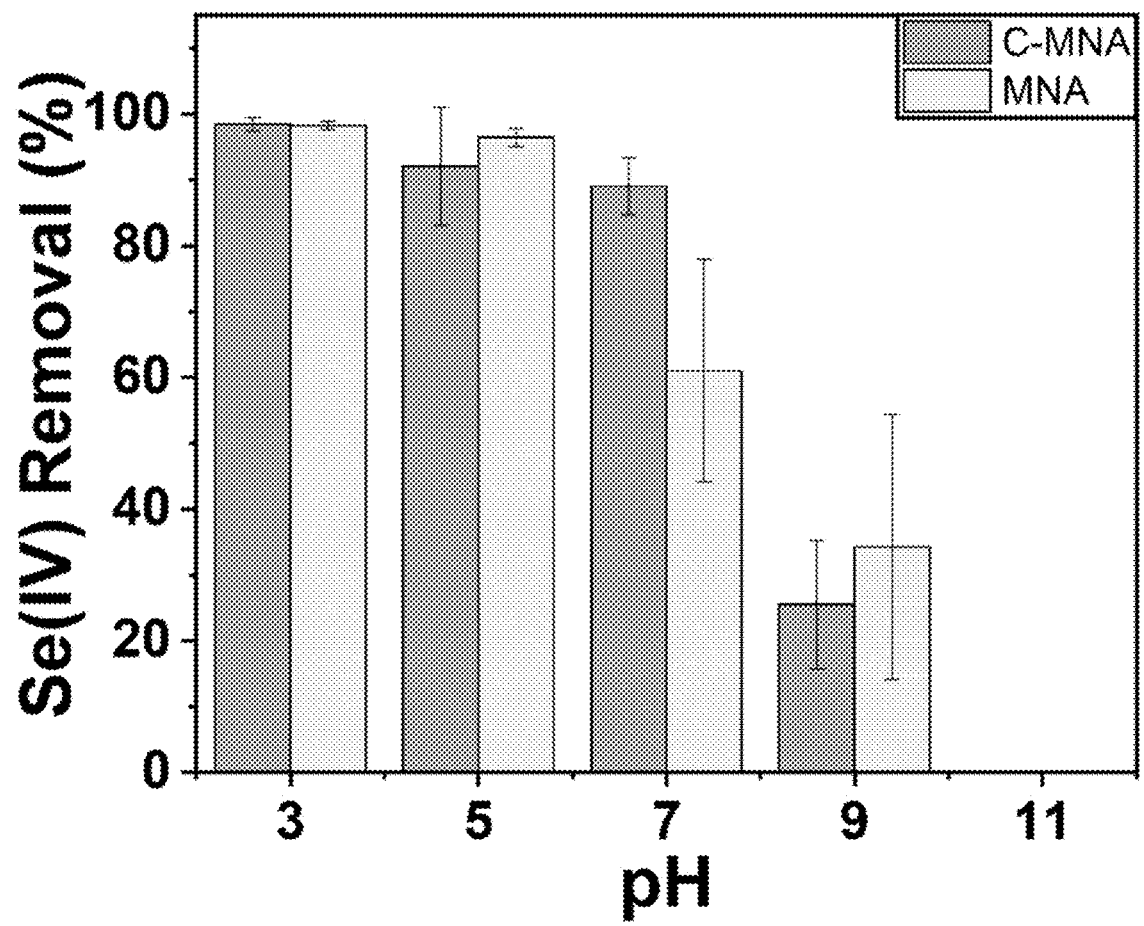
FIG. 9 is a plot of Se(IV) removal (%) versus pH for C-MNA particles and MNA particles for the selective removal of selenium from contaminated water.

FIG. 9 is a plot of Se(IV) removal (%) versus pH for C-MNA particles and MNA particles over pH 3, 5, 7, 9, and 11 with 20 mg of sorbent in 5 mL of simulated contaminated water. FIG. 9 displays comparable selenite removal at lower pH 3 and 5 between C-MNA and MNA. C-MNA shows improved adsorption performance at pH 7 and 9. Once higher pH has been reached, MNA becomes ineffective at removing any selenite, almost dropping to 0 percent removal.

Removal tests over a range of pH displayed C-MNA's improved performance at neutral and higher pH. It is believed, without wishing to be bound by theory, that this results from competition of $OH^-$, $SeO_3^{2-}$ and $HSeO_3^-$ in solution from adsorbing to MNAs. The carbon framework of C-MNA offers some protection to internal MNA from $OH^-$ resulting in improved selenium removal at pH 7 and 9. Since selenite contamination occurs in acidic to slightly basic (≤8 pH) water environments, the introduction of a carbon support is beneficial to extend the range of environments that can be treated. Also, C-MNA can be removed along with Se impurities by magnetic separation and regenerated.

Figure 10:
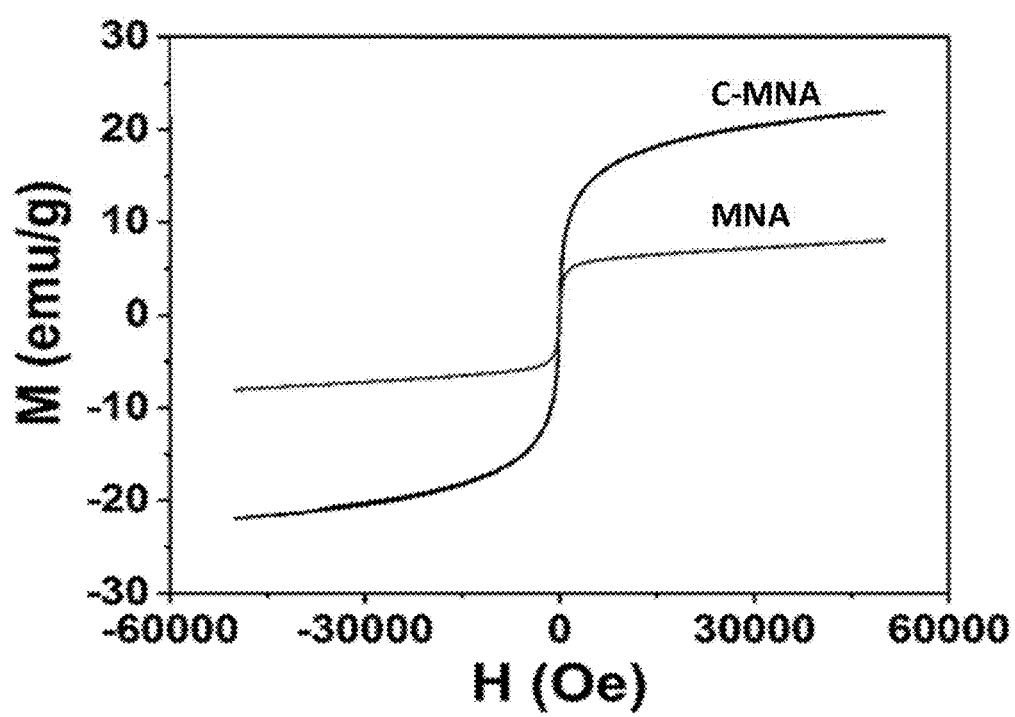
FIG. 10 is a plot of M (emu/g) versus H (Oe) for C-MNA particles and MNA particles for the selective removal of selenium from contaminated water.

FIG. 10 is a plot of M (emu/g) versus H (Oe) for C-MNA particles and MNA particles for the selective removal of selenium from contaminated water. FIG. 10 compares the field dependence magnetization of C-MNA, and MNA at room temperature both of which exhibit superparamagnetic behavior. An increase in the strength of magnetic moment from C-MNA to MNA was observed. Additionally, C-MNA has a magnetic moment almost three times the magnitude of the MNA. This is unexpected considering that carbon-support reduces the volume fraction of magnetic nanoparticles in C-MNA. This is thought to arise from the controlled precipitation of magnetic nanoparticles in the hierarchical meso- and micropore structure, which allows for the orientation of magnetic moments. During synthesis MNA does not have this size restriction, making particle formation rapid and the orientation of magnetic moments less ordered. In addition, the formation of FeO(OH) groups, which have a smaller magnetic moment than $Fe_2O_3$, from degradation due to exposure in air may also contribute to the difference in the moment difference over time.

Figure 11:
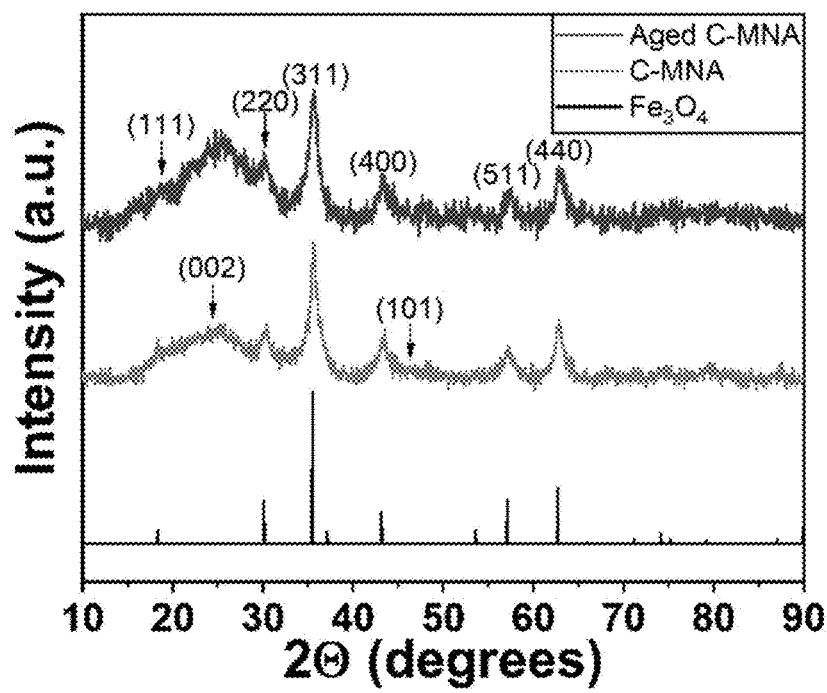
FIG. 11 is a plot of intensity (a.u.) versus 2 Θ for C-MNA particles.

FIG. 11 is a plot of intensity (a.u.) versus 2Θ for C-MNA particles. FIG. 11 depicts X-ray diffraction (XRD) patterns of C-MNA particles exposed (aged) over one month in ambient conditions. MNA displays a loss of the ferrite phase and formation of a FeO(OH) phase from oxidation. C-MNA does not undergo this change due to carbon scaffolding. Analysis by XRD in FIG. 11 shows the presence of amorphous carbon and ferric oxide, $Fe_2O_3$, peaks in C-MNA.

After exposure to ambient conditions for over 30 days, the particles remained stable due to the carbon scaffolding.

Figure 12:
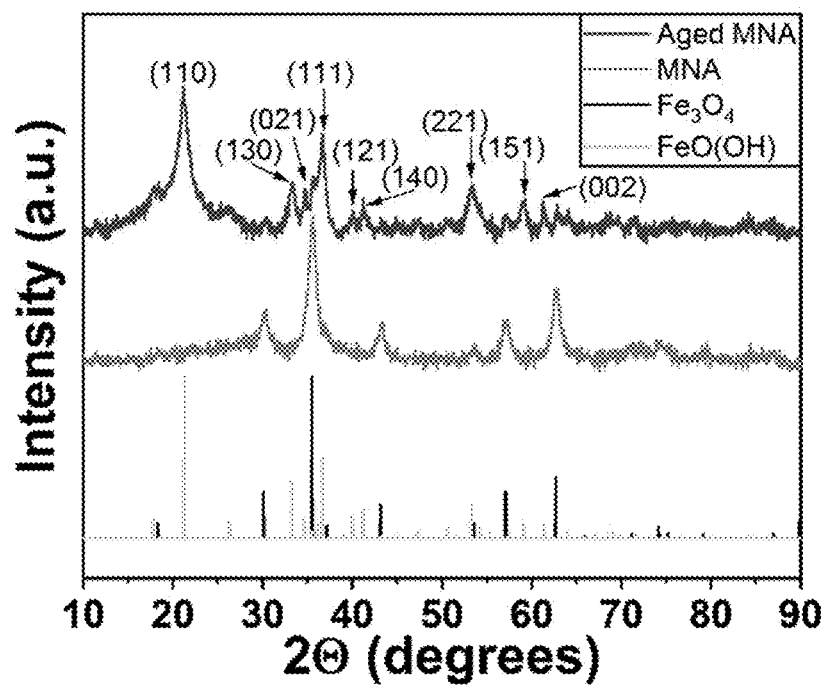
FIG. 12 is a plot of intensity (a.u.) versus 2 Θ for MNA particles.

FIG. 12 is a plot of intensity (a.u.) versus 2Θ for MNA particles. FIG. 12 shows X-ray diffraction (XRD) patterns of MNA particles exposed (aged) over one month in ambient conditions. MNA displays a loss of the ferrite phase and formation of a FeO(OH) phase from oxidation. C-MNA does not undergo this change due to carbon scaffolding. In FIG. 12 MNA particles contain mainly the $Fe_2O_3$ phase. However, after exposure to ambient conditions for over 30 days, MNA degraded to FeO(OH) phase.

Figure 13A:
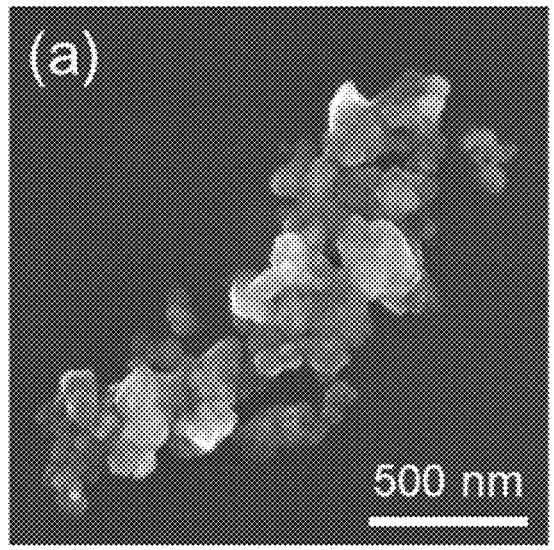
FIG. 13A-D are SEM images of FIG. 13A) C-MNA particles.
Figure 13B:
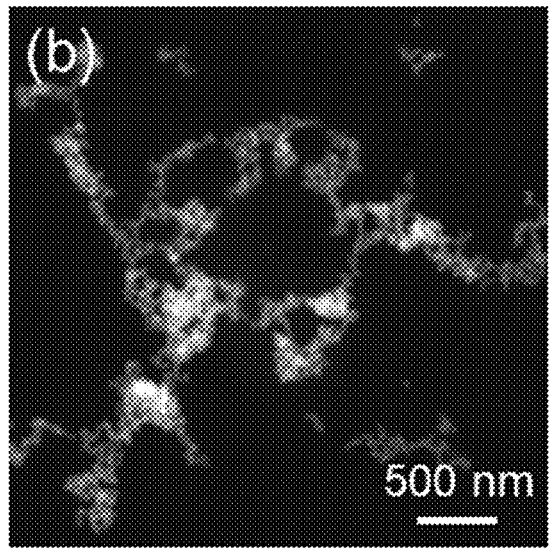
Figure 13C:
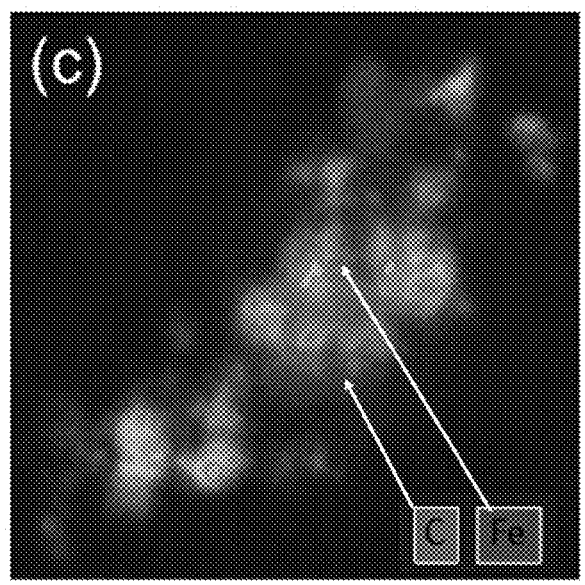
Figure 13D:
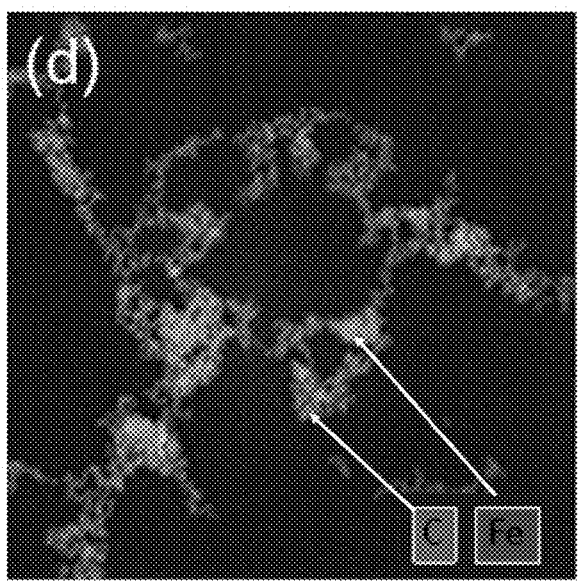

FIG. 13A-D are SEM images of FIG. 13A) C-MNA particles; FIG. 13B) MNA particles; FIG. 13C) elemental mapping of C and Fe with C-MNA particles; and FIG. 13D) elemental mapping of C and Fe with MNA particles. FIG. 13A displays the underlying carbon structure that allows for nucleation of MNA within the carbon. This is further corroborated by elemental mapping in FIG. 13C. Successful internal precipitation of MNA into the porous carbon framework was thought to improve their stability to degradation over time. This protecting effect is seen in FIG. 11. Bare MNA nanoparticles left in ambient conditions for extended periods of time undergo degradation in air and moisture, forming FeO(OH) species. This effect is not seen in C-MNA where the protecting carbon framework has led to the retention of the starting ferric oxide phase, whereas the bare MNA underwent degradation to FeO(OH), as seen in FIG. 12. The addition of a carbon structural support also suppressed the agglomeration of MNA, increasing active surface area for Se(IV) adsorption. FIG. 13C shows the uniform distribution of Fe in carbon. Also, in FIG. 13D, the presence of carbon on the surface of MNA is believed to occur from surface adsorption of atmospheric $CO_2$ with FeO(OH) surface species.

Example 2—C-MNA Adsorbents for Arsenic Removal from Contaminated Water

Tire-derived carbon was synthesized by chemically treating tire rubber with a 1:4 ratio of KOH followed by pyrolysis at 800° C. for 1 h. This synthesis increases the surface area and pore size of the molecules allowing for more material to be adsorbed. Iron magnetic nanoparticle adsorbents (MNA) were introduced to the KOH and carbon compound. Carbon material was dispersed in an aqueous solution containing $FeCl_3$ and $FeSO_4$ in a 6:5 mole ratio of Fe(III) and Fe(II). The solution was stirred for one hour, then heated to 70° C. 1 M NaOH solution was then added to initiate precipitation of MNA. The MNA when incorporated into the tire carbon (TC) produces a carbon supported magnetic nanoparticle adsorbent (C-MNA). The porosity found in the TC promotes easy infiltration of MNA. Infiltration of MNA improves stability over time, prevents agglomeration during synthesis, increases adsorption of the C-MNA, and increases the arsenic adsorption pH range of the sorbent. Additionally, the magnetic properties of the material allow for removal of arsenic by magnetic separation, improving recovery and reusability of the C-MNA. Typically, C-MNA was synthesized using iron chloride and iron sulfate, in a 17% iron and 83% carbon ratio to increase arsenic adsorption rates. C-MNA can be used for removing arsenic in a batch process or flowing water conditions or flowing through a column packed with C-MNA (with and without sand).

Arsenic adsorption tests were performed with 5 mL of diluted liquid arsenic(V) metal salt solutions at various concentrations using deionized water. Concentrations being tested range from 10-100 ppm, coupled with various amounts of C-MNA sorbents varying from 20-150 mg. C-MNA was weighed and then transferred into a 5 mL glass vial, and arsenic solution to be tested was then added to the vial. Vials were then placed on a shaker and stirred at various times ranging from 15 min to 24 h. After the vials were shaken, the liquid solution was then extracted and filtered to remove residual C-MNA with arsenic adsorbed. It is possible to recover C-MNA sorbents by treating with NaOH solution by forming sodium arsenate solution. Inductively coupled plasma optical emission spectroscopy (ICP-OES) compositional analysis was performed to determine arsenic removal from the solution using a Thermo Fisher iCAP Model 7400 ICP-OES Duo.

Figure 14:
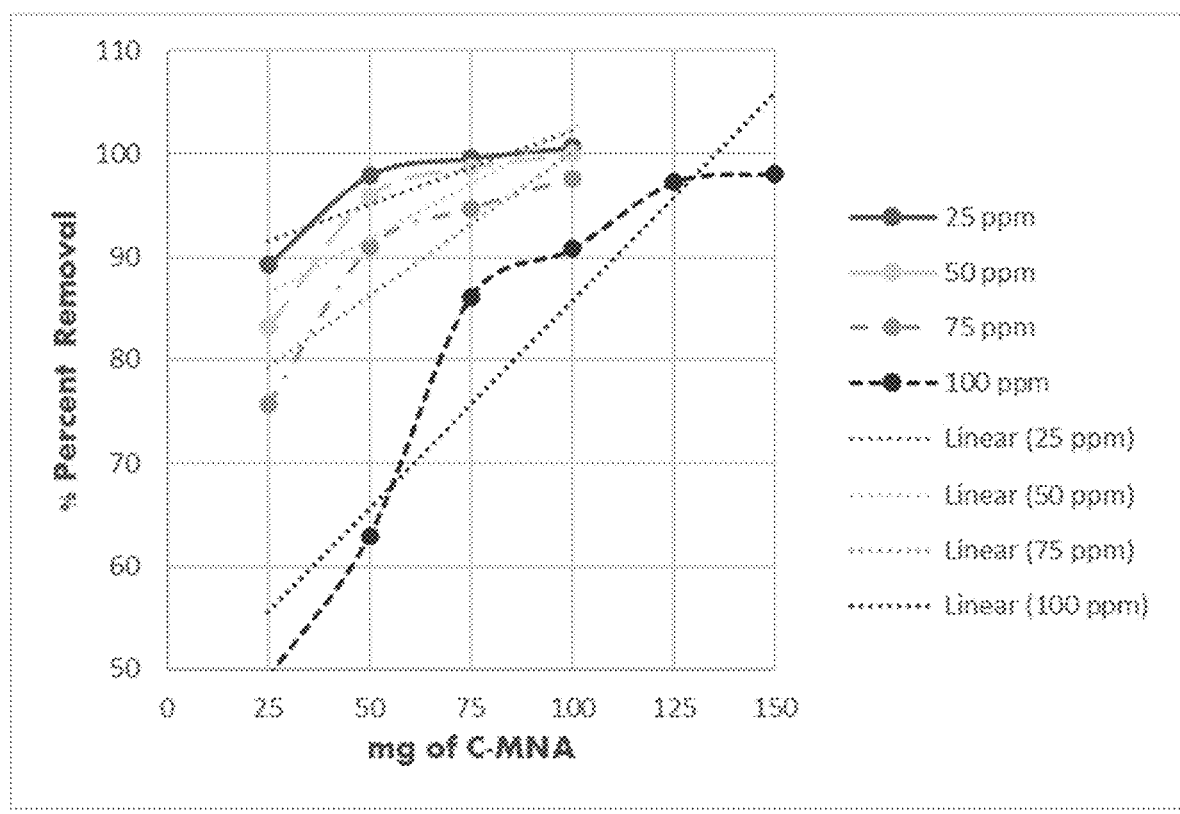
FIG. 14 is a plot of % arsenic (V) removal versus mg of C-MNA for from contaminated water.
Figure 15:
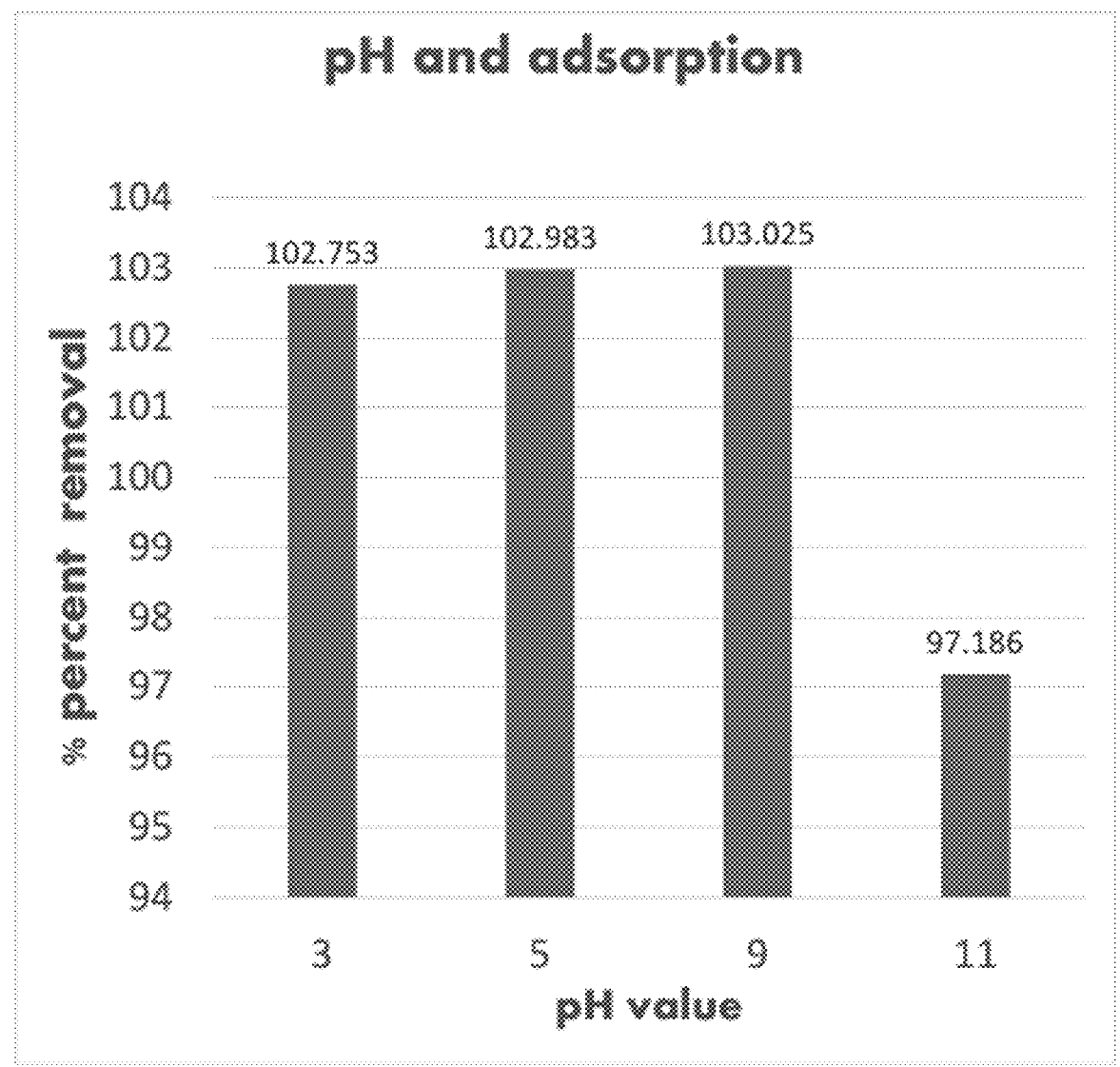
FIG. 15 is a plot of % arsenic (V) removal at pH values of 3, 5, 9 and 11 with 25 mg of C-MNA.

From the ICP results, 5 mL arsenic (V) solutions used at various concentrations (25, 50, 75, and 100 ppm) paired with various amounts of C-MNA are reported in FIG. 14. FIG. 14 is a plot of % arsenic (V) removal versus mg of C-MNA from contaminated water. FIG. 15 is a plot of % arsenic (V) removal for 5 mL of arsenic (V) at pH values of 3, 5, 9 and 11 with 25 mg of C-MNA. An analysis of FIGS. 14 and 15 indicates that optimized uptake resulted with 75 mg of C-MNA at a concentration of 25 ppm and removed around 98.5% of contaminants. Accurate percentage values for removal were not obtained for increased loadings because the ICP-OES has a minimum arsenic detection limit of 0.536 μg/L. Although this is the case, trend lines from the data permit prediction of the amount of adsorbent needed to remove 100% of arsenic from the water, in order to meet the 10 ppb arsenic standard set by the United States EPA for arsenic.

Example 3—Column with C-MNA Adsorbent for Selective Removal of Selenium(IV) from Contaminated Water Tire derived carbon (TDC) was synthesized. The activity of the tire derived carbon was enhanced. The TDC was ground with potassium hydroxide pellets (Sigma Aldrich, >85%) in a 1:4 weight ratio. The mixture was then placed in a furnace and heated at a 10° C./min ramp rate to 800° C., where it was kept under nitrogen atmosphere for 1.5 h. The mixture was then removed, cooled to ambient temperature, and neutralized with 3 M hydrochloric acid (EMD Millipore).

C-MNA was synthesized by suspending 0.5 g of activated carbon in 120 mL of deionized water containing 13 mmol of iron sulfate, $FeSO_4.7H_2O$ (Sigma Aldrich, ≥99.0%) and 15.6 mmol iron chloride, $FeCl_3.6H_2O$ (Sigma Aldrich, ≥97.0%). The mixture was then sonicated for 5 min and stirred at 70° C. for 1 h. 3 M sodium hydroxide solution was added in excess to maximize iron oxide nanoparticle (FeNP) precipitation. C-MNA was then vacuum filtered and separated from the excess iron chloride mother liquor via magnetic filtration and washing with DI water.

A solution containing 5 ppm Se(IV) at pH 5 was prepared by dissolving sodium selenite (Sigma Aldrich, 99%) into deionized water. The pH was adjusted with dilute hydrochloric acid. A column similar to that of FIG. 5 was prepared. The column was prepared by using a standard jacketed borosilicate glass column with a radius of 0.5 cm and a bed height of 13 cm, lining the bottom with approximately 2.5-cm height of cotton, adding sand containing 5 weight % of C-MNA, and finally adding 2.5-cm height of pure sand on the top. A peristaltic pump was used to deliver the Se(IV) solution at varying flow rates. The effluent was collected manually in increments of 9.5 mL and sampled for analysis via inductively coupled plasma optical emission spectroscopy (ICP-OES). The column was prepared for trials by flowing 20 mL of dilute hydrochloric acid of pH 5 through the column before adding the Se(IV) solution. After the adsorbent was fully saturated with Se(IV), the column was flushed with 1 M sodium hydroxide solution of pH 11 to desorb Se(IV).

X-ray powder diffraction (XRD) patterns were collected using a PANalytical Empyrean instrument with a Cu Kα radiation. All data was processed with HighScore Plus. Brunauer-Emmett-Teller (BET) surface areas and pore-size distributions were determined from nitrogen adsorption isotherms at 77 K using Autosorb-1 from Quantachrome. The pore-size distributions and pore volumes were calculated from the DFT/Monte Carlo method using the QSDFT adsorption branch model. ICP-OES compositional analysis was performed to determine selenite removal from the solution using a Thermo Fisher iCAP Model 7400 ICP-OES Duo. The ICP-OES has a minimum selenium detection limit of 0.77 µg/L at wavelength 196 nm. During measurements, the linear standard curve had an R2 value of 1 and a limit of detection of 0.049 ppm. A Zeiss Merlin VP scanning electron microscopy (SEM) operated at 3 kV and a Hitachi HD-2300A scanning transmission electron microscope (STEM) with a field emission source operated at 200 kV in bright-field imaging mode, at a 2.1 Å resolution, were used to characterize the surface morphologies of the samples.

The kinetic equations were derived from the kinetic rate law equation for pseudo-second order reactions, as a variety of carbon based materials display this general adsorption behavior. Equation 1 assumes that the adsorption capacity is correlated to the number of active sites on the surface.

$$\frac{dq_t}{dt} = k(q_e - q_t)^2 \quad (1)$$

In this equation, $q_e$ and $q_t$ refer to the equilibrium concentration and the concentration at time t, respectively. The k parameter is the kinetic constant. With the boundary conditions of $t_0=0$, $t=t$, $q_0=q(t=0)=0$, and $q(t)=q_t$, a solution was derived and rearranged to a linear form as seen in Equations 2-5. Equation 5 is then used to fit experimental data.

$$\frac{1}{q_e - q_t} - \frac{1}{q_e} = kt \quad (2)$$

$$\frac{q_t}{q_e^2 - q_e q_t} = kt \quad (3)$$

$$q_t = \frac{kt q_e^2}{1 + kt q_e} \quad (4)$$

$$\frac{1}{q_t} = \left(\frac{1}{kq_e^2}\right)\frac{1}{t} + \frac{1}{q_e} \quad (5)$$

The derivation of the Adams-Bohart model starts with a modified chemical rate law expression as shown in Equation 6.

$$\frac{\partial q}{\partial t} = k_{AB} C (q_0 - q) \quad (6)$$

The analytical solution provided by Adams and Bohart is shown in Equations 7 and 8.

$$\frac{C}{C_0} = \frac{\exp(\alpha)}{\exp(\alpha) + \exp(\beta) - 1} \quad (7)$$

$$\alpha = k_{AB} C_0 \left(t - \frac{Z}{v}\right); \beta = \frac{k_{AB} \rho_p q_0 Z}{v} \frac{1-\varepsilon}{\varepsilon} \quad (8)$$

Relevant Variables
k kinetic constant (g mg$^{-1}$ min$^{-1}$)
$q_e$ equilibrium concentration (mg g$^{-1}$)
$q_t$ concentration at time t (mg g$^{-1}$)
t time (min)
$C_B$ breakthrough concentration (mg cm$^{-3}$)
C sorbate concentration in bulk (mg cm$^{-3}$)
$C_0$ initial sorbate concentration in feed (mg cm$^{-3}$)
$k_{AB}$ Adams-Bohart rate constant (cm$^3$ mg$^{-1}$ s$^{-1}$)
M mass of adsorbent (g)
$N_0$ sorption capacity per unit volume of fixed bed (mg cm$^{-3}$)
q sorbate concentration in adsorbent (mg g$^{-1}$)
$q_0$ sorption capacity per mass of adsorbent (mg g$^{-1}$)
Q flow rate (cm$^3$ s$^{-1}$)
$t_B$ breakthrough time (s)
u superficial velocity (cm s$^{-1}$)
v interstitial velocity (cm s$^{-1}$)
V volume of solution (mL)
Z total bed depth (cm)
ε column void fraction
$\rho_p$ apparent adsorbent density (g cm$^{-3}$)
The following simplifications were made:
1. $\exp(\alpha), \exp(\beta) \gg 1$
   a. The quantity 1 at the denominator of Equation 7 is thus regarded as insignificant 2. $t \gg \frac{Z}{v}$ a. Since the time of the experiment far outweighs the residence time, the residence time term can be ignored.
The following definitions are also used:
1. $\rho_p q_0 (1-\varepsilon) = N_0$
2. $\varepsilon v = u$ Equation 7 is then simplified into the recognizable form in Equation 9. Although this equation is used to calculate the breakthrough time, or the time before the effluent concentration exceeds acceptable levels, the Adams-Bohart equation can be used to predict changes in the effluent concentration over time.

$$\ln\left(\frac{C_o}{C_B} - 1\right) = \frac{k_{AB} N_o Z}{u} - k_{AB} C_o t_B \quad (9)$$

Equation 9 can be rewritten with the following adjustments as seen in Equation 10.

$$\frac{N_0 Z}{u} = \frac{q_0 M}{Q}$$

The term u can be rewritten as $$\frac{Q}{A}$$

and then rewrite $N_0ZA$ as $q_oM$ since both reduce to the amount of solute adsorbed in the system.

$$\ln\left(\frac{C_o}{C_B} - 1\right) = \frac{k_{AB}q_0M}{Q} - k_{AB}C_ot_B \quad (10)$$

Figure 16:
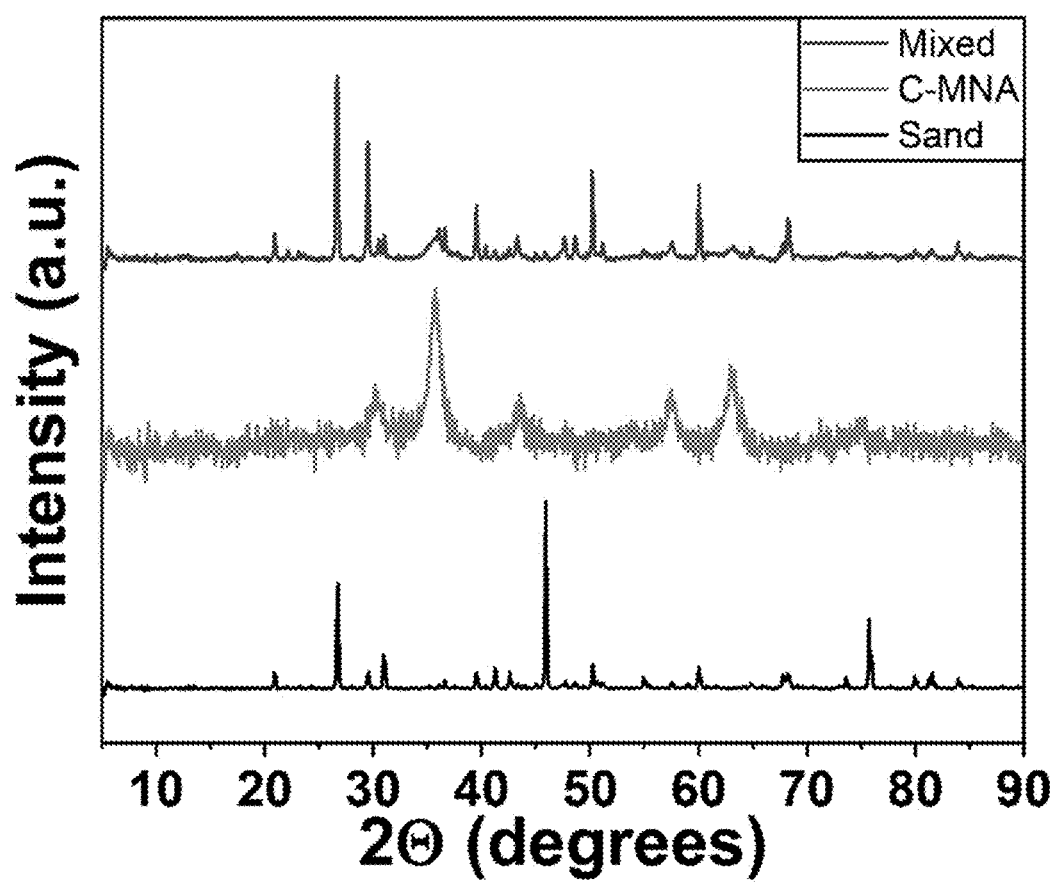
FIG. 16 is a plot of intensity (a.u.) versus 2Θ for C-MNA, sand, and mixed C-MNA and sand.

The C-MNA adsorbent utilized in this example was prepared as described above. FIG. 16 is a plot of intensity (a.u.) versus 2Θ for C-MNA, stand, and mixed C-MNA and sand. The X-ray powder diffraction (XRD) patterns of column materials sand, C-MNA, and a mixture of the two for the column mixture of adsorbent and inert packing material shown in FIG. 16 indicates the presence of both C-MNA and sand in the mixed material.

Figure 17A:
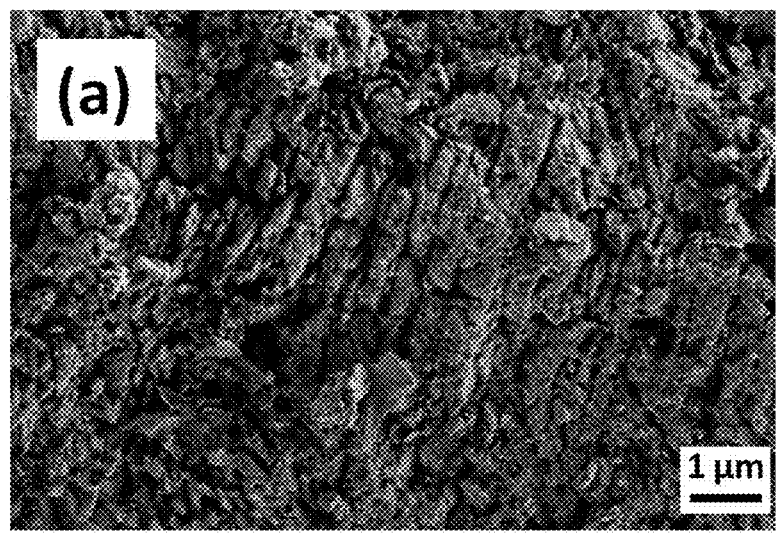
FIG. 17A-C are SEM images of FIG. 17A) sand.
Figure 17B:
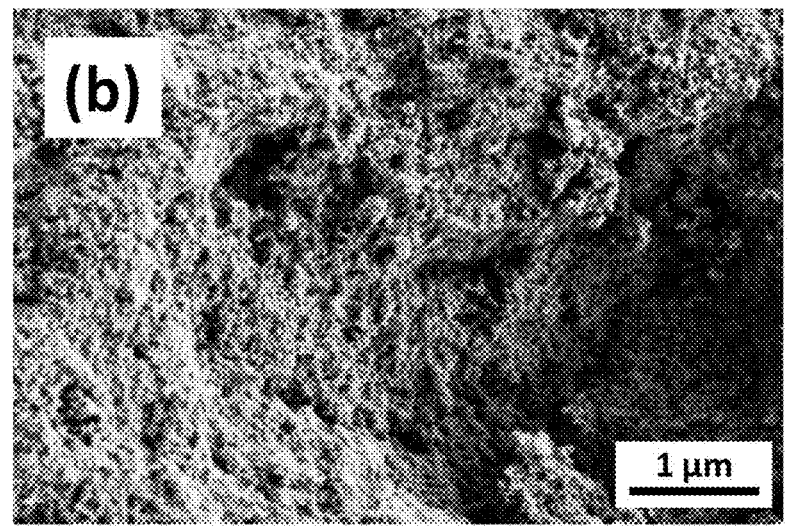
Figure 17C:
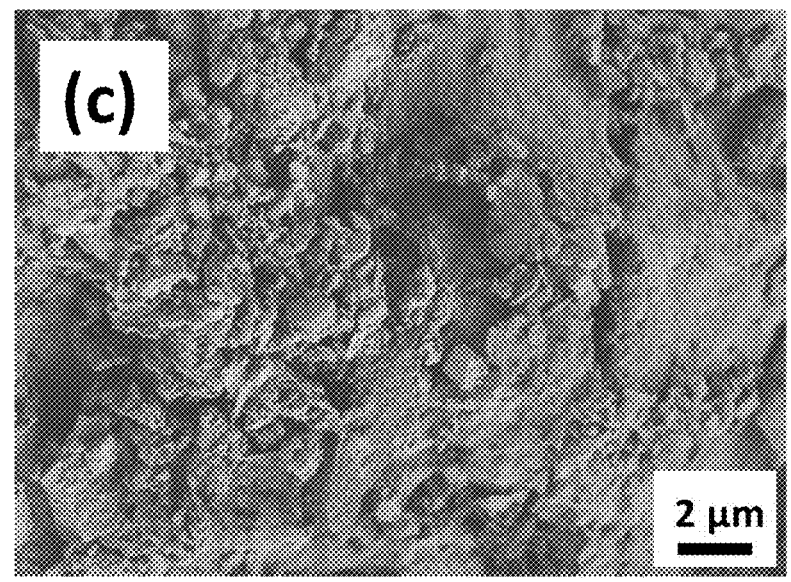

FIG. 17A-B are SEM images of sand (FIG. 17A), C-MNA adsorbent material (FIG. 17B), and sand and C-MNA (FIG. 17C). These two materials were homogeneously mixed and used in the column. BET analysis was performed to determine the surface area of the different materials as another assurance of C-MNA mixing with the inert packing material.

Figure 18A:
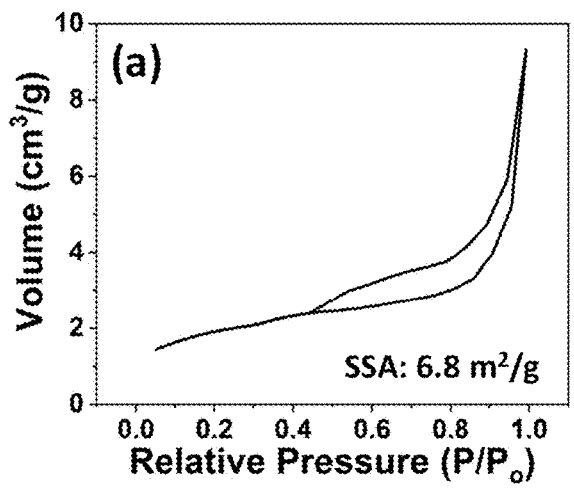
FIG. 18A-C are plots of specific volume (cm³/g) versus relative pressure ($P/P_o$) for FIG. 18A) sand.
Figure 18B:
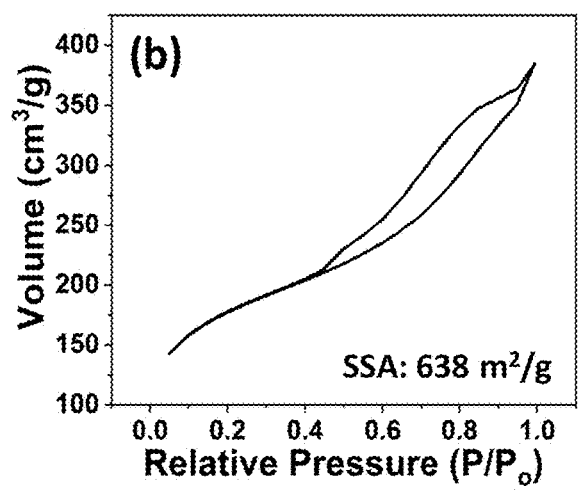
Figure 18C:
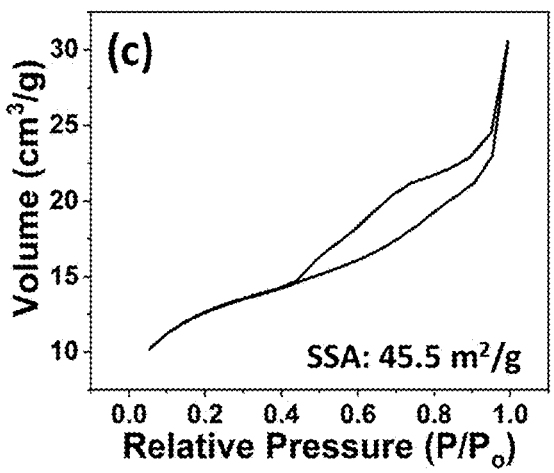

FIGS. 18A-C are plots of specific volume ($cm^3/g$) versus relative pressure (P/Po) for sand (FIG. 18A), C-MNA (FIG. 18B), and a mixture of sand and C-MNA (FIG. 18C), as used in the column. In FIGS. 18A-C, surface areas of 6.8 $m^2/g$ for sand, 638 $m^2/g$ for C-MNA, and 45.5 $m^2/g$ for the mixture were determined.

In continuous flow systems, kinetics data are normalized for comparison to the residence time. The residence time, or the total time that the solution is in contact with the sorbent, is calculated by dividing the total bed volume by the volumetric flow rate.

$$\text{Residence Time} = \frac{\text{Bed Volume}}{\text{Volumetric Flow Rate}} \quad (11)$$

By expressing kinetics relative to residence time, the effects of bed volume size or flow rate are not omitted. In the column runs, it was assumed that there was good radial mixing and no axial dispersion.

Figure 19:
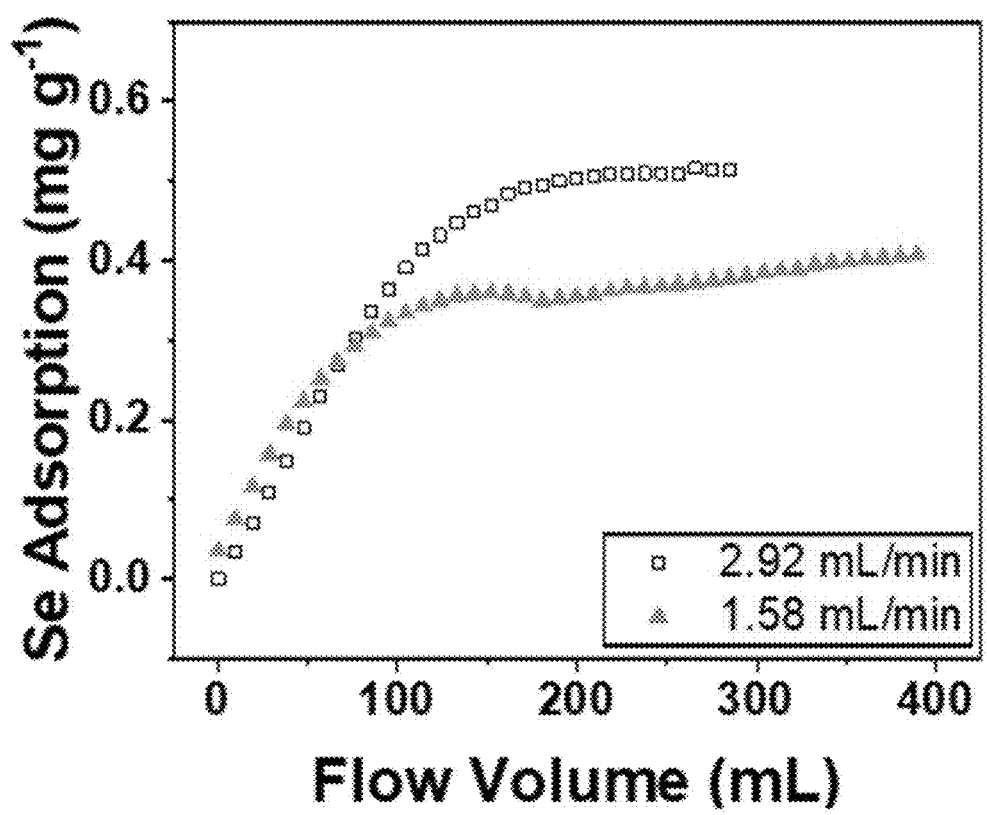
FIG. 19 is a plot of Se adsorption (mg g$^{-1}$) versus flow volume (mL) at different flow rates through an adsorption column.

FIG. 19 is a plot of Se adsorption (mg $g^{-1}$) versus flow volume (mL) at different flow rates through the adsorption column. The Se adsorption of the column at differing flow rates was used to determine breakthrough times. As seen in FIG. 19, the composite adsorbent steadily adsorbed Se(IV) until reaching a plateau between 0.4 and 0.5 mg Se per g adsorbent, suggesting monolayer formation on the carbon surface of the adsorbent. Subsequent adsorption is thought to be a result of mass transfer of Se(IV) into the mesopores of the carbon support structures and formation of a multi-layer on the surface of the iron nanoparticles, since the adsorption profile fits the two stage adsorption characteristic of a Type IV adsorption isotherm. At a higher flow rate of Se(IV) solution, the initial rate of Se(IV) adsorption is higher than Se(IV) adsorption at a lower flow rate because there is a greater concentration gradient between the bulk concentration and the concentration adsorbed, which means a greater driving force for mass transfer.

Figure 20:
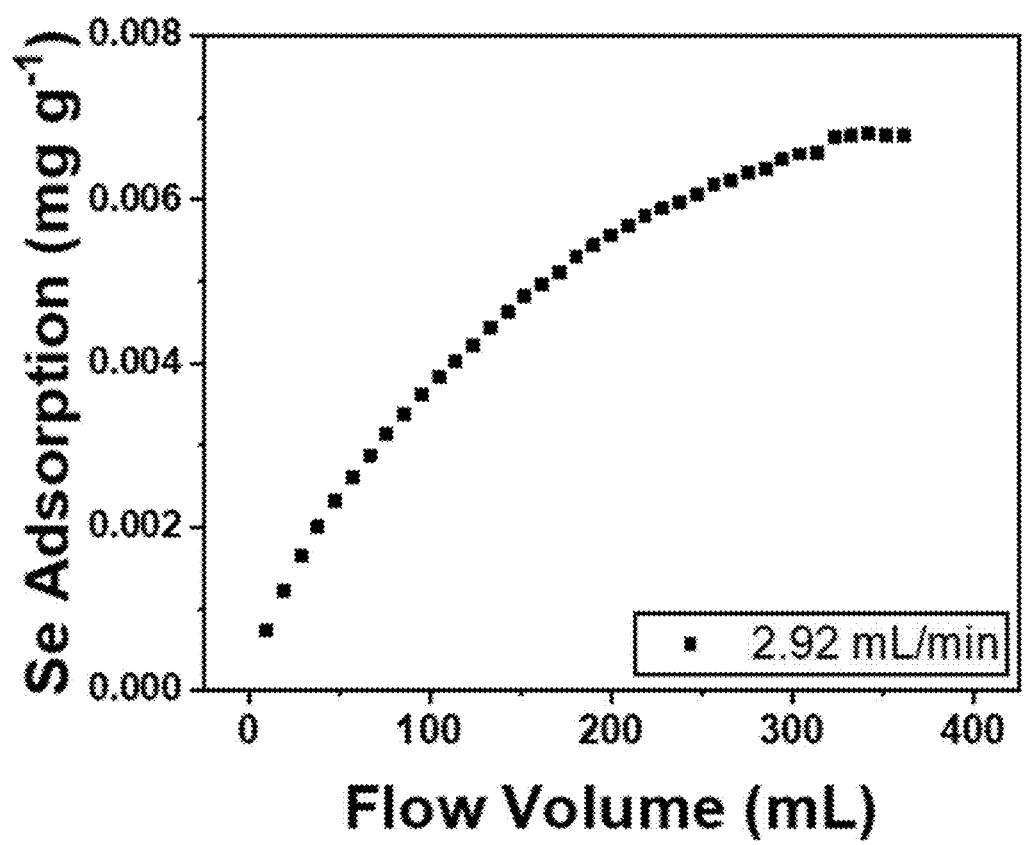
FIG. 20 is a plot of Se adsorption (mg g$^{-1}$) versus flow volume (mL) at different flow rates through an adsorption column with sand.

Sand was mixed with adsorbent because the small grain size of the adsorbent caused packing issues. Previous studies used sand as an inert medium to house sorbents. However, sand is known to adsorb some species. To quantify the adsorption capacity of the sand, a column was filled with pure sand (still including the cotton layer at the bottom), and water containing 5 ppm Se(IV) at a pH of 5 was flowed through the column. The concentration of the effluent was compared to the initial concentration to calculate how much Se(IV) was adsorbed per gram of sand. FIG. 20 is a plot of Se adsorption (mg $g^{-1}$) versus flow volume (mL) at different flow rates through an adsorption column with sand. This is the adsorption of Se in sand as a control for inert column materials present. At a flow rate of 2.92 mL/min and a pH value of 5, the adsorption capacity was low (6.8 µg/g), as shown in FIG. 20, compared to the total of ~500 µg/g in the presence of the composite adsorbent. Based on these tests the adsorption of sand was determined to be negligible. Instead, the adsorption is attributed to the embedded FeNPs and surface adsorption on the carbon support. Although correction for Se(IV) adsorption by sand did not change fundamental conclusions about the reaction rate or adsorption behavior, the equilibrium concentrations and kinetics constants were affected. As a result, all data subsequently shown and discussed contain corrections made for sand adsorption.

Figure 21:
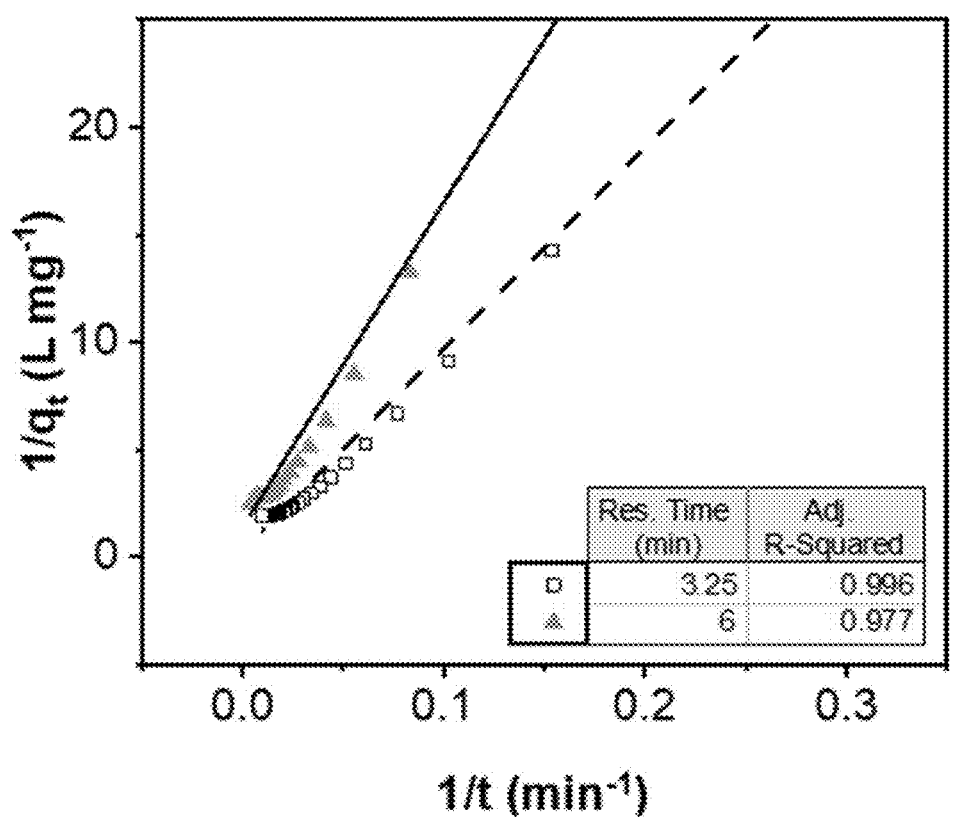
FIG. 21 is a plot of $1/q_t$ (L mg$^{-1}$) versus t (min$^{-1}$) showing a linear regression fit of data to second-order kinetics equation in agreement with expected center second-order behavior.

To further elucidate the mechanism and kinetics of the composite adsorption of previously studied carbon and iron-based adsorbents, the adsorption rate was modeled using a second-order kinetic rate equation, as shown in FIG. 21. FIG. 21 is a plot of $1/q_t$ (L $mg^{-1}$) versus t ($min^{-1}$) showing a linear regression fit of data to second-order kinetics equation in agreement with expected center second-order behavior. From FIG. 19, the adsorption kinetics is strongly consistent with pseudo-second order reactions and corroborates trends observed in kinetic data taken from other studies. The equilibrium concentration and kinetic constant were also obtained from this model and subsequently used in Adams-Bohart kinetic model calculations.

TABLE 1

Equilibrium concentration and kinetic constants from $2^{nd}$ order kinetic model fitting.

| Residence time (min) | Theoretical Se uptake (mg $g^{-1}$) | Observed Se uptake (mg $g^{-1}$) | Kinetic constant (g $mg^{-1}$ $min^{-1}$) |
| --- | --- | --- | --- |
| 3.25 | 3.305 | 0.513 | 0.001 |
| 6 | 0.724 | 0.407 | 0.013 |

Previous batch studies report the maximum adsorption concentration achieved was 1.14 mg/g. When the sorbent is mixed with inert sand in a fixed bed column, several factors could lead to a decrease in the observed uptake of Se. Channeling could restrict water flow to certain sections of the column, preventing the sorbent in that region from interacting with selenite. The inert medium could cover the mesopores in the composite sorbent, again restricting adsorbate flow to the iron nanoparticles housed within the mesopores. In addition, batch tests are performed with the adsorbent free flowing in solution, thus increasing the wettability of the sorbent in comparison to the fixed column. Finally, due to lower concentrations of the adsorbate near the bottom of the column, preventing the full utilization of the adsorbent for selenite removal, the adsorbent in that area could require extended time to reach equilibrium.

Figure 22:
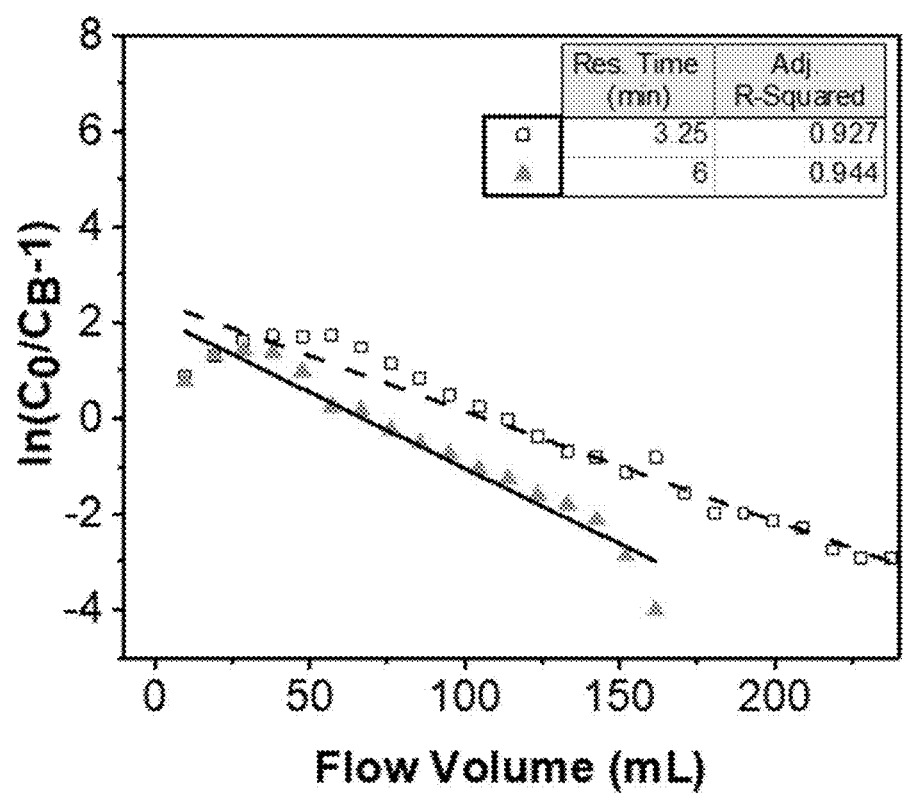
FIG. 22 is a plot of $\ln(c_0/c_B^{-1})$ versus flow volume (mL) showing a linear regression fed of data to Adams-Bohart model.

The Adams-Bohart model utilizes the following assumptions: (1) flow rate is constant, (2) absence of axial dispersion, (3) behavior matches the rectangle (irreversible) isotherm (i.e., highly favorable adsorption), and (4) adsorption rate follows second-order reaction kinetics. The data were fit with a linear regression line as shown in FIG. 22, and the rate constant ($k_{BA}$) was calculated from the m and b terms of the linear regression equation (y=mx+b). FIG. 22 is a plot of $ln(c_0/c_B^{-1})$ versus flow volume (mL) showing a linear regression fed of data to Adams-Bohart model. Values from these regressions shown in Table 2 were used in the calculation of kinetic constants in Tables 3 and 4.

The literature shows two forms (Equations 9 and 10) of the Adams-Bohart model. Although both models yield kinetic constants while maintaining dimensional homogeneity, they differ slightly in the method by which the kinetic constant is derived. One equation can be used to calculate the constants by equilibrium adsorption per unit volume, while the other can be used to determine the constants on a per unit mass basis. The two forms of the same model would be considered identical if the contents of the column were homogenized and uniform. However, the presence of both an inert medium and the composite sorbent in the column means that local densities and adsorption capacities could vary. The mass and volume of sand were included in the calculations in order to obtain more precise values. As discussed above, further tests indicated that the sand did play a minor role in the adsorption of Se(IV).

TABLE 2

Calculated linear regressions from FIG. 22.

| Res. Time (min) | Regression (y = mx + b) |
|---|---|
| 3.5 | y = −0.0502x + 2.1309 |
| 6 | y = −0.0617x + 2.4508 |

TABLE 3

Kinetic constants calculated from the slope.

| Residence time (min) | Equation used | $k_{AB}$ (mL/mg/min) |
|---|---|---|
| 3.25 | 9 | 0.011 |
|  | 10 | 0.013 |
| 6 | 9 | 0.009 |
|  | 10 | 0.009 |

TABLE 4

Kinetic constants calculated from the y-intercept.

| Residence time (min) | Equation used | $k_{AB}$ (mL/mg/min) |
|---|---|---|
| 3.25 | 9 | 0.002 |
|  | 10 | 2.167 |
| 6 | 9 | 0.005 |
|  | 10 | 4.661 |

Since the rate constant appears in both the m and b terms of the linear regression equation, each fitting could yield two rate constants. Between these two terms the slope (m) produced more consistent parameter values, making them more useful for the predictions of the fixed bed behavior. Better agreement to observed column adsorption behavior came by only including initial adsorption of the column. This is reflective of the constraints of the model, as the Adams-Bohart model is typically used to depict breakthrough curves rather than overall adsorption curves. As seen in Tables 3 and 4, many of the kinetic constants derived from the m and b component across all forms of the Adams-Bohart model and all residence times were similar. Only the values calculated on a per unit mass basis (Equation 10) deviated significantly, potentially due to variance in equilibrium concentration calculations or sand adsorption behavior. The differing rate constants from the m and b terms potentially originate from multiple kinds of adsorption taking place or multiple reactions occurring. Another possibility is the existence of a pseudo-solution which can be eliminated by comparing the kinetic rate constants from both equations and over both runs. When compared to values obtained from experimental data, the theoretical values calculated from concentration measurements resulted in rate constants that displayed a small initial deviation from the experimentally obtained values that subsequently decreased as the column reached full saturation.

The method of producing the tire-derived carbon can vary. A carbonaceous source material is soaked in a sulfonation bath to produce a sulfonated material. The sulfonated material is pyrolyzed to produce a carbon black containing product comprising a glassy carbon matrix phase having carbon black dispersed therein.

The sulfonation bath can comprise any reactant composition capable of sulfonating rubber. It is also capable of sulfonating vulcanized particulate rubbers containing carbon black or carbon particles or carbon fiber or carbon nanomaterials. In one aspect the sulfonation bath can be an oleum bath. The oleum bath can comprise up to 65 wt. % $SO_3$ in concentrated sulfuric acid. Very high $SO_3$ content in oleum bath causes solidification of reactant mix and therefore, may not be useful for processing. The sulfonation bath can be a sulfuric acid ($H_2SO_4$) solution. The concentration of sulfuric acid in the oleum bath can be between 10 and 100 wt. %. The sulfonation bath can comprise other sulfonation agents such as chlorosulfonic acid in 1,2 dichloroethane solution, organic solvents (such as 1,2 dichloroethane) containing $SO_3$ gas, or equimolar mixture of acetic anhydride concentrated sulfuric acid that yields acetyl sulfate. Acetyl sulfate assists in electrophilic sulfonation of aromatic ring in styrene containing rubbers but $SO_3$ can aid free radical sulfonation of aliphatic segments. Thus, the sulfonation bath can comprise a liquid, a gas, or a liquid and a gas. The sulfonation bath can comprise between 0.1-65 wt. % $SO_3$ in liquid medium that can be concentrated sulfuric acid or organic solvents. The sulfonation bath can comprise any minimum percentage and maximum percentage within this range, such as 5-20, 2-18, 2-30, or 0.1-2 wt. % $SO_3$. The sulfonation bath can have a temperature of between −20 to 200° C.

The pyrolysis step can be conducted at a temperature that is greater than 400° C. The pyrolysis step can be conducted at a temperature that is greater than 1000° C. The pyrolysis step can be conducted at a temperature that is between 200-1490° C. The duration of the pyrolysis step can be from 1 min to 12 h or more. The conditions of the pyrolysis step such as temperature and duration can be selected depending on process conditions including the particular carbonaceous source material that is being pyrolyzed.

The pyrolysis step of high carbon content hydrocarbon polymer composites can also be maintained at the desulfonation temperature range when sulfur containing volatiles come out of the material leaving unsaturated hydrocarbon with high carbon content. The carbon content in pyrolyzed carbon materials can be higher than 80 wt. %.

The method can include the steps of reducing the carbonaceous source material to a powder prior to contacting the carbonaceous source material with the oleum bath. The powder can be formed by any suitable method such as grinding, milling, cutting, and cryogenic pulverization. The powder so formed can have an average maximum dimension of less than 100 nm to 10 cm. Metal particles such as Ni, stainless steel, iron, and oxides such as ZnO, $SiO_2$ and others present along with carbonaceous source material may also dissolve in the oleum bath and yield carbon powder with no metals and/or oxides or up to ppm levels of metals. The presence of Ca comes from caolin or talc filler in rubber compounds and can form insoluble sulfates by reaction with sulfonating agents such as, for example, sulfuric acid. To avoid such impurities, if required, the tire rubbers can be washed with aqueous hydrochloric acid, nitric acid, or an acidic salt (for example ammonium chloride) solution prior to sulfonation.

The carbonaceous source material can be any suitable carbon black containing source material. One such source material comprises carbon black loaded plastics, scrap electronic casing containing carbon black loaded plastics that serve as electromagnetic shielding material, polymeric carbon nanocomposites containing carbon particles, and carbon fiber reinforced composites. The carbonaceous source material can be a waste material, such as scrap vulcanized rubber tires or recycled vulcanized rubbers from other sources.

The product of the invention is a carbon black containing product comprising a glassy carbon matrix phase having carbon black dispersed therein. The carbon black containing carbonaceous product is porous with a multi-modal pore size distribution with some pore width r, where 8 nm<r<120 nm and some pore width less than 8 nm but greater than 2 nm. The average pore size of the carbon black containing product can be between 2 and 120 nm. The carbon black containing product can have a Brunauer-Emmett-Teller (BET) specific surface area of less than 1000 $m^2$/g depending on the continuity of carbon matrix. The specific surface area in composite can be less than 100 $m^2$/g.

The BET specific surface area in the carbon particle containing carbon matrix products can further be modified by deploying a surface activation process. Surface activation process is well known in art that produces activated carbon. Activated carbon can be synthesized from pyrolyzed carbon residues by activating it in steam or $CO_2$ at elevated temperature ranging from 200 to 1000° C. that results partially burnt out carbon residue with higher porosity. The added porosity by surface activation is usually microporosity with pore widths less than 50 nm. Activation of carbon can also be achieved by treating it with alkali followed by heat treatment in the presence of water vapors.

Carbon black was recovered from powdered tire rubber by two methods: (1) simple pyrolysis of powder rubber at 1000° C. (nitrogen atmosphere) that yields 30-40% carbon (control rubber tire derived carbon, Sample #1) and (2) digestion of rubber powders in a hot oleum bath (18-24% $SO_3$) to yield sulfonated rubber powder that was then filtered, washed and compressed to make a solid cake followed by pyrolysis in an inert atmosphere (sulfonated rubber tire derived carbon, Sample #2). Sample 2 produced a carbon monolith with a little higher yield (2-5% increase in carbon yield compared to the control rubber powder Sample 1) whereas Sample 1 produced fluffy (low bulk density) powder of carbon black. The isolated carbon material (from either sample) was used to test their electrochemical performance as an active anode material in Li-ion battery.

Carbon black was also isolated from ground tire rubber by conventional pyrolysis (400-1490° C. in inert atmosphere) followed by treatment of the char with oleum bath and subsequent heat treatment of washed/dried charred residue in inert environment. The oleum bath can have a concentration of 0.1-30 wt. % $SO_3$. Since the material was charred before treatment in sulfonation bath it does not require very high temperature treatment in second carbonization step. The second heat treatment can be above 200° C.; however, higher temperature gives higher rigidity or graphitic order in the derived carbon.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

The invention claimed is:

1. An adsorbent for a target compound, comprising porous carbon particles having pores with a predominant pore size less than 10 nm, and magnetic nanoparticles (MNP) nucleated on the carbon surface and within the pores of carbon particles to provide a carbon magnetic nanoparticle adsorbent (C-MNA).

2. The adsorbent of claim 1, wherein the pores of the porous carbon comprise a mixture of micropores having a pore size less than 2 nm, mesopores having a pore size of from 2-50 nm, and macropores having pore size greater than 50 nm.

3. The adsorbent of claim 1, wherein the carbon comprises tire derived carbon (TDC).

4. The adsorbent of claim 1, wherein the carbon comprises activated carbon.

5. The adsorbent of claim 1, wherein the carbon particle size is 10-2000 microns.

6. The adsorbent of claim 1, wherein the MNP particle size is 2-100 nm with predominant size of less than 10 nm.

7. The adsorbent of claim 1, wherein the surface area of the carbon is from 200-1200 $m^2$/g.

8. The adsorbent of claim 7, wherein after impregnation with the MNP, the surface area of the carbon in the C-MNA is 10-100 $m^2$/g.

9. The adsorbent of claim 7, wherein after impregnation with the MNP, the surface area of the carbon in the C-MNA is 25-50 $m^2$/g.

10. The adsorbent of claim 1, wherein the proportion of MNP to carbon is from 1-30%, by weight based on the total weight of the carbon and MNP.

11. The adsorbent of claim 1, wherein the target compounds comprise compounds that will chemically coordinate with the MNP.

12. The adsorbent of claim 1, wherein the MNP comprises at least one selected from the group consisting of $Fe_3O_4$, $Fe_2O_3$, FeO, CoO, $CO_2O_3$, $Co_3O_4$, CrO, $Gd_2O_3$, $Dy_2O_3$, MnBi, $BaFe_{12}O_{19}$, $SrFe_{12}O_{19}$, $M_2Fe_2O_4$ (M=Co; Zn;

Mn,Zn; Co,Zn; Fe,Zn; Ni,Zn), FeNi, FeCo, FeSi, $Nd_2Fe_{14}B$, $Sm_2Co_5$, $Sm_2Co_{17}$, $SmFe_{16}N_2$, and $Fe_{16}N_2$.

13. The adsorbent of claim 1, wherein the target compound comprises at least one selected from the group consisting of selenium, tellurium, chromium, copper, cadmium, barium, mercury, arsenic and lead.

14. The adsorbent of claim 1, wherein the adsorption capacity of the adsorbent is from 7 mg/g to 100 mg/g of target compound to C-MNA.

15. A method for removing target compounds with an adsorbent, comprising the steps of:
providing a magnetically activated adsorbent for the target compounds, comprising porous carbon particles having pores with a pore size less than 10 nm, and magnetic nanoparticles (MNP) nucleated on the carbon surface and within the pores of carbon particles to provide a carbon magnetic nanoparticle adsorbent (C-MNA);
contacting the target compounds with the C-MNA.

16. The method of claim 15, further comprising the step of regenerating the adsorbent to remove contaminant from the adsorbent.

17. The method of claim 16, wherein the regeneration step comprises treating the adsorbent with a basic solution.

18. The method of claim 17, wherein the basic solution comprises 0.1-1 molar NaOH.

19. The method of claim 16, wherein target compounds are contained within a liquid, and the regenerating step comprises the step of separating the used adsorbent particles from the liquid.

20. The method of claim 19, further comprising the step of, after contacting the C-MNA particles with the target compound, applying a magnetic field to attract the C-MNA particles with the target compound, and separating and regenerating the C-MNA particles.

21. The method of claim 15, wherein the target compounds are contained in a liquid, and further comprising the step of adjusting the pH before the contacting step.

22. The method of claim 21, wherein the adjusting step comprises adjusting to a pH of from 3-10.

23. The method of claim 22, wherein the target compounds are contaminants and are provided in a liquid waste stream, and further comprising the step of treating the waste stream to raise the pH.

24. The method of claim 15, wherein the contacting step comprises positioning the adsorbent in a column, and flowing the target compounds through the column to contact the adsorbent.

25. The method of claim 24, further comprising the step of adding silica to the column to increase the macroporosity of the column and prevent clogging.

26. The method of claim 25, wherein the amount of silica that is added is from 5-50 weight percent based on the combined weight percentage of the adsorbent and the silica.

27. The method of claim 26, further comprising the step of adding a filler, the filler comprising 10-40 weight percentage of cotton, based on the total weight of the C-MNA, silica, and cotton.

28. The method of claim 15, wherein the target compounds comprise compounds that will chemically coordinate with the MNP.

29. The method of claim 15, wherein the target compound comprises at least one selected from the group consisting of selenium, tellurium, chromium, copper, cadmium, barium, mercury, arsenic and lead.

30. The method of claim 29, wherein the target compound is a cation.

31. The method of claim 30, wherein the cation comprises at least one selected from the group consisting of the $4^+$ oxidation state of selenium ($Se^{4+}$) and the 5+ oxidation state of arsenic ($As^{5+}$).

32. The method of claim 15, wherein the MNP comprises at least one selected from the group consisting of $Fe_3O_4$, $Fe_2O_3$, FeO, CoO, $Co_2O_3$, $Co_3O_4$, CrO, $Gd_2O_3$, $Dy_2O_3$, MnBi, $BaFe_{12}O_{19}$, $SrFe_{12}O_{19}$, $M_2Fe_2O_4$ (M=Co; Zn; Mn,Zn; Co,Zn; Fe,Zn; Ni,Zn), FeNi, FeCo, FeSi, $Nd_2Fe_{14}B$, $Sm_2Co_5$, $Sm_2Co_{17}$, $SmFe_{16}N_2$, $Fe_{16}N_2$, and $Fe_3O_4$.

33. A system for removing contaminants from liquids, comprising:
a container;
an adsorbent in the container, the adsorbent comprising porous carbon particles having pores with a pore size less than 10 nm, and magnetic nanoparticles (MNP) nucleated on the carbon surface and within the pores of carbon particles to provide a carbon magnetic nanoparticle adsorbent (C-MNA).

34. The system of claim 33, wherein the container comprises a fluid inlet and a fluid outlet, fluid flowing in through the inlet, through the adsorbent, and out through the outlet.

35. The system of claim 34, wherein the container is a column.

36. The system of claim 35, wherein the column comprises silica.

37. The system of claim 36, wherein the liquid is a slurry.

38. The system of claim 33, wherein the C-MNA is provided on a support.

39. The system of claim 38, wherein the support comprises a filter.

40. The system of claim 33, further comprising a magnetic field source for attracting C-MNA particles with adsorbed target compound for regeneration of the C-MNA particles.

41. A method of adsorbing target compounds from a fluid, comprising the steps of:
providing a container;
providing an adsorbent in the container, the adsorbent comprising porous carbon particles having pores with a pore size less than 10 nm, and magnetic nanoparticles (MNP) nucleated on the carbon surface and within the pores of carbon particles to provide a carbon magnetic nanoparticle adsorbent (C-MNA);
contacting the target compounds with the adsorbent in the container.

42. The method of claim 41, wherein the target compound comprises at least one selected from the group consisting of selenium, tellurium, chromium, copper, cadmium, barium, mercury, arsenic and lead.

43. The method of claim 41, wherein the C-MNA particles are adhered to a filter, and the liquid is caused to flow through the filter.

* * * * *